United States Patent
Ko et al.

(10) Patent No.: US 10,225,226 B2
(45) Date of Patent: Mar. 5, 2019

(54) TERMINALS AND METHOD OF COMMUNICATION BETWEEN SAME

(71) Applicant: SAMSUNG ELECTRONICS CO., LTD., Suwon-si (KR)

(72) Inventors: Hyeon-mok Ko, Hwaseong-si (KR); Jae-han Kim, Suwon-si (KR); Kil-lyeon Kim, Suwon-si (KR); Sung-jin Park, Yongin-si (KR); Yun-sun Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 306 days.

(21) Appl. No.: 15/152,067

(22) Filed: May 11, 2016

(65) Prior Publication Data

US 2016/0337302 A1 Nov. 17, 2016

Related U.S. Application Data

(60) Provisional application No. 62/159,519, filed on May 11, 2015.

(30) Foreign Application Priority Data

Jun. 26, 2015 (KR) .......................... 10-2015-0091585

(51) Int. Cl.
| | |
|---|---|
| H04M 3/56 | (2006.01) |
| H04L 12/18 | (2006.01) |
| H04L 12/58 | (2006.01) |
| H04L 29/06 | (2006.01) |

(52) U.S. Cl.
CPC .......... *H04L 51/26* (2013.01); *H04L 12/1822* (2013.01); *H04L 65/4038* (2013.01); *H04L 65/4046* (2013.01); *H04M 3/566* (2013.01); *H04M 2207/18* (2013.01)

(58) Field of Classification Search
None
See application file for complete search history.

(56) References Cited

U.S. PATENT DOCUMENTS

| | | | |
|---|---|---|---|
| 8,269,817 B2 | 9/2012 | Kumar et al. | |
| 2002/0077136 A1* | 6/2002 | Maggenti | H04L 63/0428 455/518 |
| 2005/0068907 A1* | 3/2005 | Garg | H04M 3/5237 370/270 |
| 2005/0220069 A1* | 10/2005 | Li | H04L 45/306 370/349 |
| 2006/0205430 A1* | 9/2006 | Park | H04W 4/10 455/518 |
| 2006/0281482 A1* | 12/2006 | Yoshida | H04W 4/10 455/518 |
| 2007/0171861 A1* | 7/2007 | Akhtar | H04L 29/06027 370/329 |
| 2007/0197199 A1 | 8/2007 | Lee | |
| 2008/0090547 A1 | 4/2008 | Struhsaker | |
| 2008/0159177 A1* | 7/2008 | Balachandran | H04L 12/1822 370/260 |
| 2009/0144441 A1 | 6/2009 | LoGalbo et al. | |
| 2011/0289203 A1 | 11/2011 | Braudes et al. | |
| 2013/0016174 A1* | 1/2013 | Wu | H04L 65/4038 348/14.07 |
| 2014/0112244 A1 | 4/2014 | Lindner et al. | |
| 2014/0228011 A1 | 8/2014 | Goel et al. | |
| 2014/0378149 A1 | 12/2014 | Lau et al. | |
| 2017/0188205 A1* | 6/2017 | Ventura Jaume | H04W 4/10 |
| 2018/0077208 A1* | 3/2018 | Li | H04L 65/4046 |
| 2018/0242120 A1* | 8/2018 | Baek | H04L 12/18 |

FOREIGN PATENT DOCUMENTS

| | | |
|---|---|---|
| EP | 2299628 A1 | 3/2011 |
| WO | 2014/210185 A1 | 12/2014 |

OTHER PUBLICATIONS

Communication dated Aug. 4, 2016, issued by the International Searching Authority in counterpart International Application No. PCT/KR2016/004905 (PCT/ISA/220, 210, 237).
"OMA PoC System Description", Open Mobile Alliance, Approved Version 2.1, Aug. 2, 2011, XP055370801. (421 pages total).
"3rd Generation Partnership Project; Technical Specification Group Services and System Aspects; Study on application architecture to support Mission Critical Push to Talk over LTE (MCPTT) services (Release 13)", 3GPP TR 23.779,vol. SA WG6, No. V0.6.0, Mar. 3, 2015, pp. 1-100, XP050927634. (100 pages total).
Communication dated May 3, 2018 by the European Patent Office in counterpart European Patent Application No. 16792972.8.

* cited by examiner

*Primary Examiner* — Brian Whipple
(74) *Attorney, Agent, or Firm* — Sughrue Mion, PLLC

(57) ABSTRACT

A method of communication among a plurality of terminals, including transmitting, by a first terminal of the plurality of terminals, a call setup request message of the first terminal to at least one other terminal of the plurality of terminals; and establishing, by the first terminal, a session with the at least one other terminal, the at least one other terminal having received the call setup request message of the first terminal, wherein a terminal having a floor of the session is determined based on priority information regarding terminals that requested the floor from among the plurality of terminals.

17 Claims, 30 Drawing Sheets

TERMINALS AND METHOD OF COMMUNICATION BETWEEN SAME

CROSS-REFERENCE TO RELATED APPLICATIONS

This application claims benefit from U.S. Provisional Application No. 62/159,519, filed on May 11, 2015, in the US Patent Office and Korean Patent Application No. 10-2015-0091585, filed on Jun. 26, 2015, in the Korean Intellectual Property Office, the disclosures of which are incorporated herein in their entireties by reference.

BACKGROUND

1. Field

The present disclosure relates to methods of performing communications between terminals, terminals performing communications, and a non-transitory computer readable recording medium having recorded thereon a method of performing communications between terminals.

2. Description of the Related Art

Currently, a protocol commonly used for establishing a session on a network is a session initiation protocol (SIP). When a terminal to establish a session transmits an INVITE message to a SIP server, the SIP server transmits INVITE messages to terminals related to the corresponding session. Terminals invited to join the corresponding session transmit OK messages in response to the INVITE messages.

Protocols used for controlling a floor on a network include a binary floor control protocol (BFCP) and a media burst control protocol (MBCP), where a central server, which always exists, processes floor requests. It may be considered that a terminal obtains a floor by receiving a Grant message in response to a Request message. Both of these two widely-used protocols are centralized methods, where all requests are transmitted to a server and the server processes the requests.

SUMMARY

Provided are methods of performing communications between a plurality of terminals in a distributed fashion without a terminal functioning as a server.

Additional aspects will be set forth in part in the description which follows and, in part, will be apparent from the description, or may be learned by practice of the presented exemplary embodiments.

According to an aspect of an exemplary embodiment, a method of communication among a plurality of terminals includes transmitting, by a first terminal of the plurality of terminals, a call setup request message of the first terminal to at least one other terminal of the plurality of terminals; and establishing, by the first terminal, a session with the at least one other terminal, the at least one other terminal having received the call setup request message of the first terminal, wherein a terminal having a floor of the session is determined based on priority information regarding terminals that requested the floor from among the plurality of terminals.

The method may further include monitoring whether a call setup request message of the at least one other terminal is received within a pre-set time period, wherein, if the call setup request message of the at least one other terminal is not received during the pre-set time period, the call setup request message of the first terminal is transmitted.

The method may further include, if a pre-existing session is already established between the first terminal and the at least one other terminal, receiving a message announcing that the pre-existing session from the at least one other terminal.

The call setup request message of the first terminal may include at least one from among identification information regarding the plurality of terminals, identification information regarding the first terminal, information regarding a priority of the first terminal, and information regarding a random number generated by the first terminal, and, a call setup accept message accepting the establishing of the session is received from the at least one other terminal.

The establishing of the session may include receiving a call setup request message of the at least one other terminal during a pre-set buffering period initiated after the call setup request of the first terminal is transmitted; and selecting a selected terminal from among the first terminal and the at least one other terminal based on priority information of the first terminal and the at least one other terminal.

The establishing of the session may include updating one from among the first terminal and the at least one other terminal based on at least one call setup accept message of the plurality of terminals received during a pre-set period initiated after the buffering period.

The establishing of the session may include: comparing information included in at least one call setup accept message received during a random back-off period initiated after the pre-set buffering period, to information regarding the selected terminal; and, if the information included in the at least one call setup accept message is different from the information regarding the selected terminal, transmitting a call setup accept message of the first terminal to the at least one other terminal after the random back-off period.

The method may further include: transmitting a floor requesting message of the first terminal for requesting the floor to the at least one other terminal; receiving a floor request accept message from the at least one other terminal, wherein the at least one other terminal corresponds to an earliest random back-off period termination from among the plurality of terminals; and initiating a data transmission of the first terminal to the at least one other terminal.

The at least one other terminal may include a second terminal of the plurality of terminals, and the method further may include receiving a floor requesting message of the second terminal from the second terminal, wherein, if a priority of the first terminal is higher than a priority of the second terminal, the second terminal initiates a data transmission of the second terminal after the data transmission of the first terminal is terminated.

The at least one other terminal may include a third terminal of the plurality of terminals, and the method further may include: receiving a floor requesting message of the third terminal from the third terminal; and, if a priority of the third terminal is higher than a priority of the first terminal, stopping the data transmission of the first terminal and releasing the floor to the third terminal.

The method may further include: receiving a data transmission of the third terminal from the third terminal; and, obtaining the floor in response to receiving a floor release message announcing termination of a data transmission of the third terminal from the third terminal.

The at least one other terminal may include a fourth terminal of the plurality of terminals, and the method further may include: transmitting a floor requesting message requesting the floor to the at least one other terminal; receiving a floor request accept message from the fourth terminal, the fourth terminal being a floor arbitrator; and initiating a data transmission of the first terminal to the at least one other terminal.

The at least one other terminal may include a third terminal of the plurality of terminals, and the method further may include: receiving a floor requesting message of the third terminal from the third terminal; if a priority of the third terminal is higher than a priority of the first terminal, receiving a floor revoke message from the fourth terminal; and stopping the data transmission of the first terminal.

The at least one other terminal may include a second terminal of the plurality of terminals, the method may further include receiving a floor requesting message of the second terminal from the second terminal, and wherein, if a priority of the first terminal is higher than a priority of the second terminal, the second terminal may receive a floor request accept message regarding the second terminal from the fourth terminal after the data transmission of the first terminal is terminated.

The method may further include: receiving a floor delegation requesting message from the fourth terminal transmitting a floor delegation accept message to the fourth terminal, and determining the first terminal to be the floor arbitrator.

When the session is established, the first terminal may be determined to be a call controller having call control of the session, and the method may further include transmitting a call control delegation message delegating the call control to the at least one other terminal based on a communication status of the first terminal.

The at least one other terminal may include a second terminal of the plurality of terminals, and the method may further include: receiving a floor requesting message of the second terminal from the second terminal; transmitting a floor request accept message to the second terminal; and receiving a data transmission of the second terminal from the second terminal.

The at least one other terminal may include a third terminal of the plurality of terminals, and the method may further include: receiving a floor requesting message of the third terminal from the third terminal; transmitting a floor revoke message to the second terminal; and receiving a data transmission of the third terminal from the third terminal.

The method may further include, when the data transmission of the third terminal is terminated, receiving the data transmission of the second terminal from the second terminal.

The method may further include: storing information regarding the second terminal; and when the data transmission of the third terminal is terminated, transmitting a new floor request accept message regarding the second terminal.

According to another aspect of an exemplary embodiment, a first terminal includes a communicator configured to transmit a call setup request message of the first terminal to at least one other terminal of a plurality of terminals; and a controller, configured to establish a session with the at least one other terminal, the at least one other terminal having received the call setup request message of the first terminal, wherein a terminal having a floor of the session is determined based on priority information regarding terminals that requested the floor from among the plurality of terminals.

The controller may be further configured to monitor whether a call setup request message of the at least one other terminal is received within a pre-set time period, and, if the call setup request message of the at least one other terminal is not received during the pre-set time period, the communicator may be further configured to transmit the call setup request message of the first terminal.

If a pre-existing session is already established between the first terminal and the at least one other terminal, the communicator may be further configured to receive a message announcing the pre-existing session from the at least one other terminal.

The call setup request message of the first terminal may include at least one from among identification information regarding the plurality of terminals, identification information regarding the first terminal, information regarding a priority of the first terminal, and information regarding a random number generated by the first terminal, and, the controller may be further configured to receive a call setup accept message for accepting the establishing of the session from the at least one other terminal.

The communicator may be further configured to receive a call setup request message of the at least one other terminal during a pre-set buffering period initiated after the call setup request message of the first terminal is transmitted, and the controller may be further configured to select a selected terminal from among the first terminal and the at least one other terminal based on priority information of the first terminal and the at least one other terminal.

The controller may be further configured to update one from among the first terminal and the at least one other terminal based on at least one call setup accept message of the plurality of terminals received during a pre-set period initiated after the buffering period.

The controller may be further configured to compare information included in at least one call setup accept message received during a random back-off period initiated after the pre-set buffering period, to information regarding the selected terminal, and, if the information included in the at least one call setup accept message is different from the information regarding the selected terminal, the communicator may be further configured to transmit a call setup accept message of the first terminal to the at least one other terminal after the random back-off period.

The communicator may be further configured to transmit a floor requesting message of the first terminal for requesting the floor to the at least one other terminal, receive a floor request accept message from the at least one other terminal, wherein the at least one other terminal corresponds to an earliest random back-off period termination from among the plurality of terminals, and initiating a data transmission of the first terminal to the at least one other terminal.

The at least one other terminal may include a second terminal of the plurality of terminals, and the communicator may be further configured to receive a floor requesting message of the second terminal from the second terminal, and, if a priority of the first terminal is higher than a priority of the second terminal, the second terminal a data transmission of the second terminal after the data transmission of the first terminal is terminated.

The at least one other terminal may include a third terminal of the plurality of terminals, and the communicator may be further configured to receive a floor requesting message of the third terminal from the third terminal, and, if a priority of the third terminal is higher than a priority of the first terminal, data transmission of the first terminal is terminated and the third terminal obtains the floor.

The communicator may be further configured to receive a data transmission of the third terminal from the third terminal, and, when a floor release message announcing termination of data transmission is received from the third terminal, the first terminal obtains the floor.

The at least one other terminal may include a fourth terminal of the plurality of terminals, and the communicator may be further configured to transmit a floor requesting message for requesting the floor to the at least one other terminal, receive a floor request accept message from the fourth terminal, the fourth terminal being a floor arbitrator, and initiating a data transmission to the plurality of terminals.

The at least one other terminal may include a third terminal of the plurality of terminals, and the communicator may be further configured to receive a floor requesting message of the third terminal from the third terminal and, if a priority of the third terminal is higher than a priority of the first terminal, receive a floor revoke message from the fourth terminal and stop the data transmission of the first terminal.

The at least one other terminal may include a second terminal of the plurality of terminals, and the communicator may be further configured to receive a floor requesting message of the second terminal from the second terminal, and, if a priority of the first terminal is higher than a priority of the second terminal, the second terminal may receive a floor request accept message regarding the second terminal from the fourth terminal after the data transmission of the first terminal is terminated.

The communicator may be further configured to receive a floor delegation requesting message from the fourth terminal, and transmit a floor delegation accept message to the fourth terminal, and determine the first terminal to be the floor arbitrator.

When the session is established, the first terminal may be determined to be a call controller having call control of the session, and the communicator may be further configured to transmit a call control delegation message delegating the call control to the at least one other terminal based on a communication status of the first terminal.

The at least one other terminal may include a second terminal of the plurality of terminals, and the communicator may be further configured to receive a floor requesting message of the second terminal from the second terminal, transmit a floor request accept message to the second terminal, and receive a data transmission of the second terminal from the second terminal.

The at least one other terminal may include a third terminal of the plurality of terminals, and the communicator may be further configured to receive a floor requesting message of the third terminal from the third terminal, transmit a floor revoke message to the second terminal, and receive a data transmission of the third terminal from the third terminal.

When the data transmission of the third terminal is terminated, the communicator may be further configured to receive the data transmission of the second terminal from the second terminal.

The first terminal may further include a memory configured to store information regarding the second terminal, wherein, when the data transmission of the third terminal is terminated, the communicator may be further configured to transmit a new floor request accept message regarding the second terminal.

According to yet another aspect of an exemplary embodiment, a non-transitory computer readable recording medium may have recorded thereon a computer program for implementing the methods described herein.

According to a further aspect of an exemplary embodiment, a method for transmitting data includes transmitting, by a first terminal, a call request setup message to a second terminal; receiving, by the first terminal, a call request accept message from the second terminal; establishing a communication session between the first terminal and the second terminal; transmitting, by the first terminal, a floor request message of the first terminal to the second terminal; receiving, by the first terminal, a floor request accept message from the second terminal; transmitting, by the first terminal, a data transmission of the first terminal to the second terminal.

The call request setup message may be received by a third terminal, and the method may further include: receiving, by the first terminal, a call request accept message from the third terminal; adding the third terminal to the communication session; receiving, by the first terminal, a floor request message of the third terminal from the third terminal; comparing a priority of the third terminal with a priority of the first terminal; if the priority of the third terminal is higher than the priority of the first terminal, transmitting a floor request accept message regarding the third terminal from the first terminal to the second terminal and the third terminal; and receiving, by the first terminal, a data transmission of the third terminal.

The method of claim 42, may further include: receiving, by the first terminal, a floor request message of the second terminal from the second terminal; comparing a priority of the second terminal with the priority of the third terminal; if the priority of the second terminal is lower than the priority of the third terminal, adding the second terminal to a waitlist; when the data transmission of the third terminal is terminated, transmitting a floor request accept message regarding the second terminal from the first terminal to the second terminal and the third terminal; and receiving, by the first terminal, a data transmission of the second terminal.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
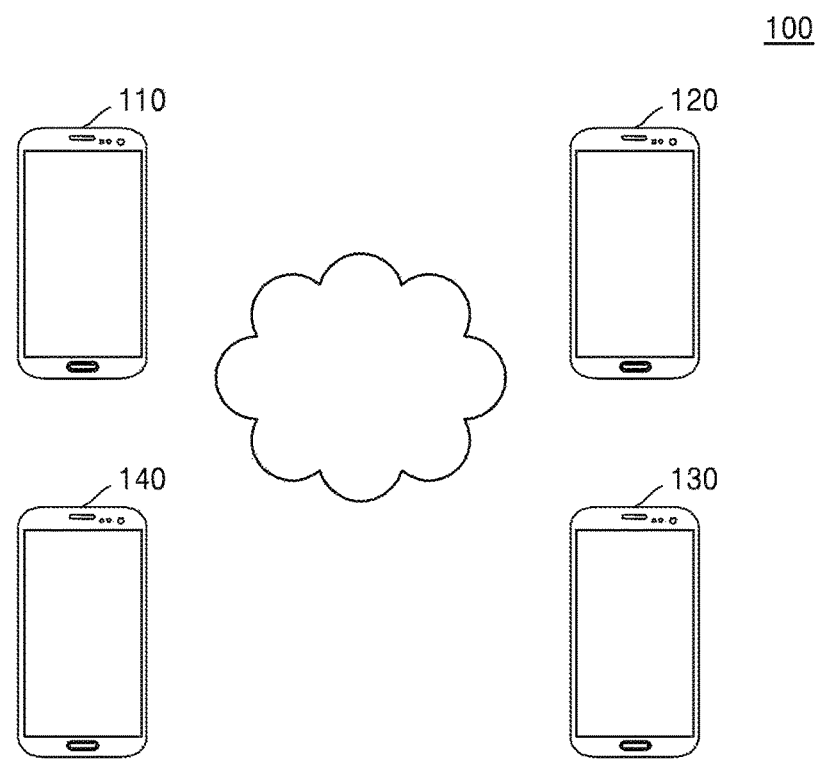
FIG. 1 is a diagram for describing a communication system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used in the present specification will be briefly described, and then exemplary embodiments will be described in detail.

In addition, although the terms used in exemplary embodiments are selected from generally known and used terms, some of the terms mentioned in the description of exemplary embodiments have been selected by the applicant at his or her discretion, the detailed meanings of which are described in relevant parts of the description herein. Furthermore, it is required that exemplary embodiments are understood, not simply by the actual terms used but by the meaning of each term lying within.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, exemplary embodiments will be described more fully with reference to the accompanying drawings. These exemplary embodiments may, however, be embodied in many different forms and should not be construed as limited to the exemplary embodiments set forth herein. Rather, the exemplary embodiments are provided so that this disclosure will be thorough and complete. In drawings, certain elements are omitted for clarity, and like elements denote like reference numerals throughout the specification.

FIG. 1 is a diagram for describing a communication system 100 according to an exemplary embodiment.

The communication system 100 according to an exemplary embodiment may include a plurality of terminals 110, 120, 130, and 140.

The communication system 100 shown in FIG. 1 includes only components related to the present exemplary embodiment. Therefore, it would have been obvious to one of ordinary skill in the art that the communication system 100 may include general-purpose components other than the components shown in FIG. 1. For example, the communication system 100 may further include terminals other than the plurality of terminals 110, 120, 130, and 140.

Referring to FIG. 1, in the communication system 100, a session for transmitting and receiving data may be established between the plurality of terminals 110, 120, 130, and 140. Here, the plurality of terminals 110, 120, 130, and 140 may be terminals belonging to any one of at least one pre-set group in the communication system 100.

At least one terminal (e.g., a first terminal 110) from among the plurality of terminals 110, 120, 130, and 140 may initiate a session establishing protocol for establishing a session with the other terminals 120, 130, and 140 in the communication system 100. For example, the first terminal 110 may initiate a session establishing protocol by transmitting call setup messages to a second terminal 120, a third terminal 130, and a fourth terminal 140, respectively. Hereinafter, a terminal that transmits call setup messages will be referred to as a call initiating terminal.

The first terminal 110 according to an exemplary embodiment may transmit call setup messages to the other terminals 120, 130, and 140 in a group. When the second terminal 120 receives a call setup message, the second terminal 120 may determine whether to accept a session initiated by the first terminal 110.

For example, based on whether there is an already established session, the second terminal 120 may determine whether to accept a session initiated by the second terminal 120. If there is an already established session, the second terminal 120 may not accept the session initiated by the first terminal 110.

In another example, when the second terminal 120 receives a call setup message, the second terminal 120 may determine whether to accept a session initiated by the first terminal 110 based on whether there is another terminal that transmitted a call setup message. For example, if the second terminal 120 receives call setup messages respectively from the first terminal 110 and the third terminal 130, the second terminal 120 may accept a session initiated by a terminal with higher priority from among the first terminal 110 and the third terminal 130.

If the second terminal 120 according to an exemplary embodiment determines to accept a session initiated by the first terminal 110, the second terminal 120 may transmit call setup accept messages indicating that the second terminal 120 accepts the session initiated by the first terminal 110 to the other terminals 110, 130, and 140 in the group. However, this is merely an example. In another example, the second terminal 120 may accept a session without transmitting call setup accept messages to the terminals 110, 130, and 140 in the group.

In another example, if the second terminal 120 does not establish a session, the second terminal 120 may transmit call setup decline messages indicating that no session is accepted to the other terminals 110, 130, and 140 in the group, respectively. For example, if there is an already established session between the second terminal 120 and the first terminal 110, the second terminal 120 may transmit a call setup decline message to the first terminal 1120. Detailed descriptions thereof will be given below with reference to FIG. 6.

Meanwhile, the third terminal 130 and the fourth terminal 140 may operate in the same regard as the second terminal 120.

If a session is established in the communication system 100 according to an exemplary embodiment, for notification of the establishment of the session between the terminals 110, 120, 130, and 140 in a group, an arbitrary terminal in the group may periodically transmit call setup messages.

According to another exemplary embodiment, if there is a call controller in a group, the call controller may periodically transmit call setup messages notifying establishment of a session to the other terminals in the group (e.g., the terminals 120, 130, and 140).

Furthermore, the call controller may function as a floor arbitrator that determines a terminal that is authorized to transmit data (referred to hereinafter as a terminal having a floor) in the communication system 100. However, this is merely an exemplary embodiment. In the communication system 100, a call controller is not always identical to a floor arbitrator.

For example, if a call controller is identical to a floor arbitrator, the first terminal 110 determined as the call controller may determine a terminal having a floor. For example, if the first terminal 110 receives a floor requesting message from the second terminal 120 and the third terminal 130, the first terminal 110 may determine a terminal having a floor based on pre-set priorities of the second terminal 120 and the third terminal 130.

According to another exemplary embodiment, in the communication system 100, a call controller may be different from a floor arbitrator. For example, the call controller may be determined based on information regarding terminals included in call setup messages transmitted and received within a group. In another example, a call controller may be determined based on information regarding terminals included in neighbor search messages transmitted and received within a group. However, this is merely an exemplary embodiment, and methods of determining a call controller are not limited thereto. For example, a call controller may be pre-set in a group.

Meanwhile, in another example, no floor arbitrator may exist in a group. If there is no floor arbitrator, each of the terminals 110, 120, 130, and 140 in a group may transmit messages for floor arbitration according to a pre-set protocol, thereby controlling data transmission and reception within the communication system 100. For example, a terminal corresponding to an earliest random back-off period termination from among the terminals 110, 120, 130, and 140 many transmit messages for floor arbitration. The messages for floor arbitration may include a floor revoke message, a floor release message, a floor accept message, a transmission wait request message, and a floor grant message. However, these are merely examples, and messages for floor arbitration are not limited thereto.

Furthermore, in an exemplary embodiment in which the communication system 100 does not include a call controller, any one of the terminals 110, 120, 130, and 140 may be a floor arbitrator. Here, the floor arbitrator may operate in the same regard as a floor arbitrator in a communication system with a call controller as described above Furthermore, according to another exemplary embodiment, the communication system 100 may include neither a call controller nor a floor arbitrator. In this case, each of the terminals 110, 120, 130, and 140 in a group may transmit messages for floor arbitration according to a pre-set protocol, thereby controlling data transmission and reception within the communication system 100, same as in the above exemplary embodiment in which the call controller exists and no floor arbitrator exists.

Figure 2:
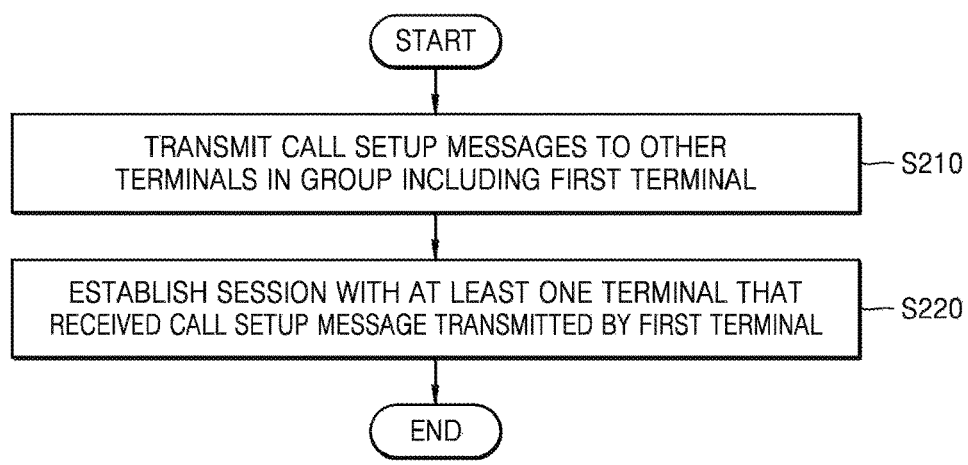
FIG. 2 is a flowchart of a method by which a first terminal according to an exemplary embodiment establishes a session with other terminals in a group.

FIG. 2 is a flowchart for describing a method by which the first terminal 110 according to another exemplary embodiment establishes a session with the other terminals 120, 130, and 140 in a group.

In operation S210, the first terminal 110 transmits call setup messages to the other terminals 120, 130, and 140, respectively.

The first terminal 110 according to an exemplary embodiment may multicast a call setup message to the second terminal 120, the third terminal 130, and the fourth terminal 140. According to another exemplary embodiment, the first terminal 110 may unicast a call setup message to each of the second terminal 120, the third terminal 130, and the fourth terminal 140. Here, a call setup message may be periodically multicasted or unicasted.

A call setup message according to an exemplary embodiment may include information regarding a port used to transmit and receive data, codec information regarding data, information regarding an encryption key used for establishing a session, information regarding a password key used for communication security, and information regarding a port used for controlling transmission and reception of data. However, these are merely examples, and information included in a call setup message are not limited thereto. In another example, a call setup message may include identification information regarding a group including the first terminal 110, identification information regarding the first terminal 110, information regarding the priority of the first terminal 110 in the group, information regarding a random number generated by the first terminal 110, etc. Information regarding a random number may be generated every time the first terminal 110 transmits a call setup message. Information regarding a random number may be used to select any one of a plurality of terminals when the plurality of terminals correspond to a same priority.

A call setup message according to an exemplary embodiment may include at least some of the above-stated information. However, this is merely an example, and a call setup message may further include other information for establishing a session between terminals in a group.

In operation S220, the first terminal 110 establishes a session with at least one of terminals 120, 130, and 140 that received the call setup messages transmitted by the first terminal 110.

The first terminal 110 according to an exemplary embodiment may establish a session with at least one of the terminals 120, 130, and 140 that received the call setup messages transmitted by the first terminal 110, based on port information, password key information, and codec information included in the transmitted call setup messages.

According to another exemplary embodiment, the first terminal 110 may establish a session based on responses from the terminals 120, 130, and 140 that received the call setup messages transmitted by the first terminal 110.

For example, the first terminal 110 may receive a call setup accept message from at least one of the second terminal 120, the third terminal 130, and the fourth terminal 140. As the first terminal 110 receives call setup accept messages, the first terminal 110 may establish sessions with the second terminal 120, the third terminal 130, and the fourth terminal 140, respectively.

In another example, the first terminal 110 may receive a call setup decline message indicating that there is an already established session from at least one of the second terminal 120, the third terminal 130, and the fourth terminal 140. If the first terminal 110 receives a call setup decline message, a session initiated by the first terminal 110 may not be established.

Meanwhile, according to an exemplary embodiment, after a session is established, the first terminal 110 may periodically transmit messages notifying the second terminal 120, the third terminal 130, and the fourth terminal 140 about the established session. However, this is merely an exemplary embodiment, and an arbitrary terminal from among the first terminal 110, the second terminal 120, the third terminal 130, and the fourth terminal 140 may periodically transmit messages notifying the other terminals in a group about an established session. Furthermore, a terminal transmitting messages notifying an established session may not be limited to any one of the terminals 110, 120, 130, and 140 in a group.

In the communication system 100, a terminal having a floor may be determined based on information regarding the priorities of the terminals 110, 120, 130, and 140 with which sessions are established.

As a session is established, the first terminal 110 according to an exemplary embodiment may be determined as a call controller. Furthermore, as a floor arbitrator, the first terminal 110 may arbitrate floors for the terminals 110, 120, 130, and 140 with which sessions are established. However, this is merely an exemplary embodiment, and another terminal in a group may be determined as a floor arbitrator. In another example, there may be no floor arbitrator in a group.

Meanwhile, in the communication system 100, data and messages may be transmitted and received between the plurality of terminals 110, 120, 130, and 140 via at least one of multicast and unicast. However, this is merely an exemplary embodiment, and data transmission/reception mechanisms are not limited thereto.

Figure 3:
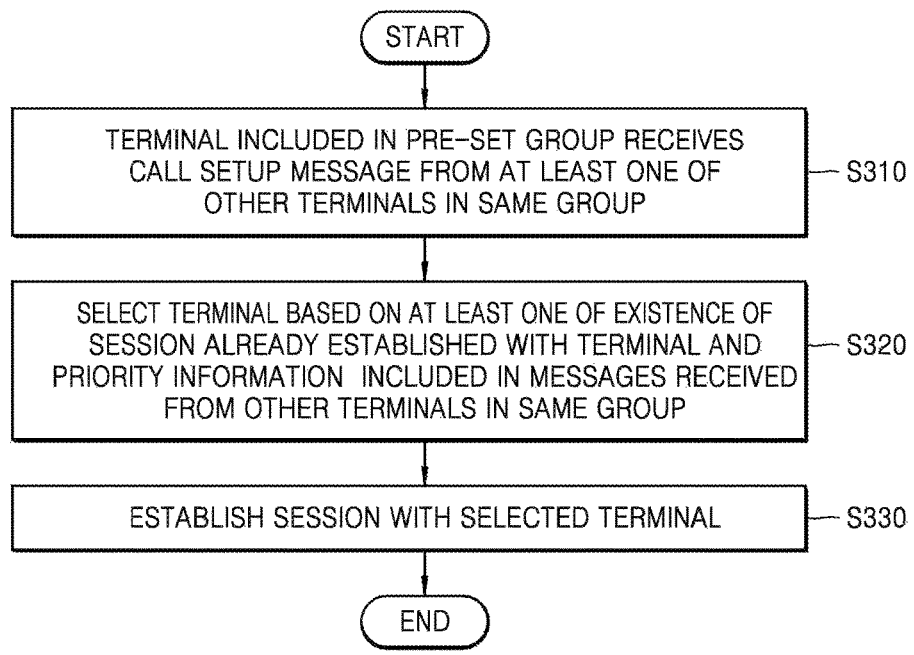
FIG. 3 is a flowchart of a method by which a second terminal according to an exemplary embodiment establishes a session with another terminal in a group.

FIG. 3 is a flowchart for describing a method by which the second terminal 120 according to an exemplary embodiment establishes a session with another terminal in a group (e.g., the first terminal 110).

In operation S310, the second terminal 120 receives a call setup message from at least one terminal (e.g., the first terminal 110) from among the other terminals 110, 130, and 140 in a group to which the second terminal 120 belongs. For example, the second terminal 120 may receive a call setup message from the first terminal 110. Furthermore, in another example, the second terminal 120 may receive call setup messages from two or more terminals (e.g., the first terminal 110 and the third terminal 130).

In operation S320, the second terminal 120 may select any one terminals based on at least one of whether there is a session already established with respect to the second terminal 120 and priority information included in the call setup message(s).

When the second terminal 120 according to an exemplary embodiment receives a call setup message from the first terminal 110, the second terminal 120 may determine whether there is an already established session. If there is no established session, the second terminal 120 may establish a session with the first terminal 110.

In another example, if there is an already established session, the second terminal 120 may transmit a call setup decline message notifying that there is the already established session to the first terminal 110. The second terminal 120 may select an arbitrary value from a pre-set range and transmit a call setup decline message to the first terminal 110 after a time period corresponding to the selected value is elapsed from a time point at which the call setup message is received.

Meanwhile, if a call setup decline message received from at least one of the third terminal 130 and the fourth terminal 140 is identical to a call setup decline message to be transmitted by the second terminal 120, the second terminal 120 may not transmit the call setup decline message to the first terminal 110. Detailed descriptions thereof will be given below with reference to FIG. 4.

According to another exemplary embodiment, if the second terminal 120 receives call setup messages from the first terminal 110 and the third terminal 130, the second terminal 120 may compare the priority of the first terminal 110 to that of the third terminal 130 and select any one of the first terminal 110 and the third terminal 130. Here, the priorities may be pre-set with respect to the terminals 110, 120, 130, and 140 in the communication system 100. For example, if the priority of the first terminal 110 is higher than that of the third terminal 130, the second terminal 120 may select the first terminal 110. Detailed descriptions thereof will be given below with reference to FIG. 7.

However, this is merely an example, and as another example the second terminal 120 may select any one of the first terminal 110 and the third terminal 130 based on time points at which call setup messages are respectively received from the first terminal 110 and the third terminal 130.

The second terminal 120 according to an exemplary embodiment may select any one terminal based on call setup messages received during a pre-set buffering period. For example, if the second terminal 120 receives a call setup message from the first terminal 110 during a pre-set buffering period, the second terminal 120 may select the first terminal 110.

Meanwhile, in the communication system 100 according to an exemplary embodiment, in a case where some call setup messages are not received during a buffering period due to reasons including a communication abnormality, a selected terminal may be changed based on a call setup message received after the buffering period. For example, after a buffering period is terminated, the second terminal 120 may determine whether a selected terminal is appropriate based on call setup accept messages received during random back-off periods and updating periods. Here, call setup accept messages may be respectively transmitted by the terminals 110, 120, 130, and 140 in a group after of respective random back-off periods set to the terminals 110, 120, 130, and 140 are terminated. According to an exemplary embodiment, if a call setup accept message transmitted by a terminal corresponding to the earliest random back-off period termination is identical to a call setup accept message to be transmitted by the second terminal 120, the second terminal 120 may not transmit the call setup accept message.

If it is determined based on received call setup accept messages that there is a call setup message not received by the second terminal 120, the second terminal 120 may re-select a terminal. For example, if a call setup message from the third terminal 130 is not received, the second terminal 120 may re-select the third terminal 130 based on call setup accept messages of the other terminals received during random back-off periods and updating periods.

In operation S330, the second terminal 120 may establish a session with a selected terminal. For example, if the second terminal 120 has selected first terminal 110 from the terminals 110 and 130 that transmitted call setup messages in a group, the second terminal 120 may establish a session based on the call setup message received from the first terminal 110.

After the session is established, the second terminal 120 according to an exemplary embodiment may transmit floor requesting messages to the other terminals 110, 130, and 140 in the group, respectively.

If the second terminal 120 according to an exemplary embodiment obtains a floor, the second terminal 120 may transmit data to the other terminals 110, 130, and 140 in the group. Here, a method by which the second terminal 120 obtains a floor may correspond to the method described above with reference to FIG. 1.

Figure 4A:
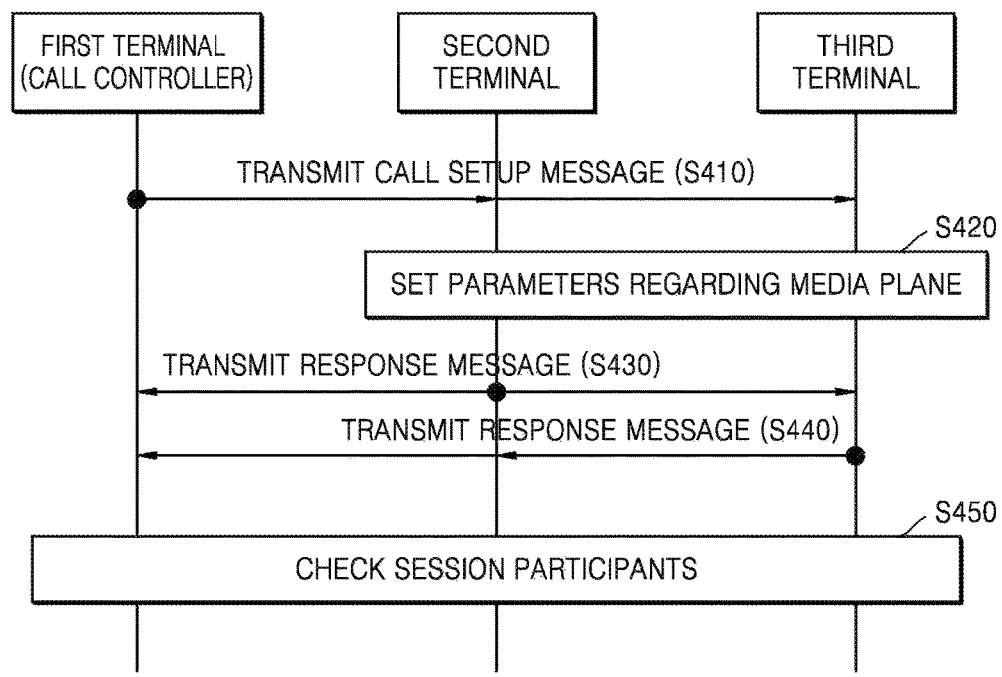
FIG. 4A is a flowchart of a method by which terminals in a group establish sessions, according to an exemplary embodiment.

FIG. 4A is a flowchart for describing a method by which the terminals 110, 120, 130, and 140 in group establish sessions, according to an exemplary embodiment.

In operation S410, the first terminal 110 may transmit call setup messages to the other terminals 120 and 130, respectively.

In operation S420, the second terminal 120 and the third terminal 130 may set parameters related to a media plane based on the call setup messages received from the first terminal 110.

In operation S430, the second terminal 120 may transmit response messages to the other terminals 110 and 130 in a group.

In operation S440, the third terminal 130 may transmit response messages to the other terminals 110 and 120 in the group.

Meanwhile, the operation S430 and the operation S440 may be performed in a reversed order.

In operation S450, as a session is established, the terminals 110, 120, and 130 in the group may check terminals participating the session.

Figure 4B:
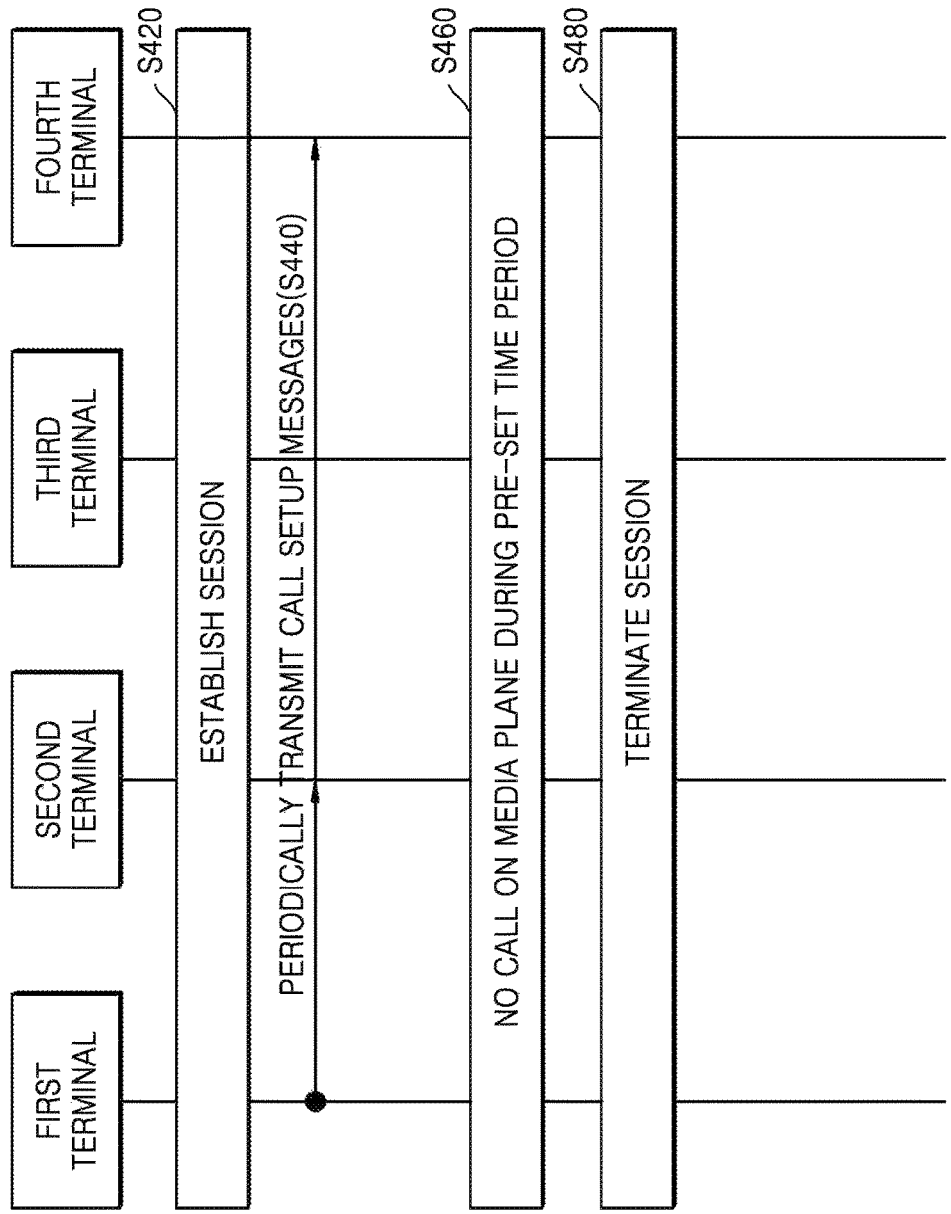
FIG. 4B is a flowchart of a method by which terminals in a group establish a session.

FIG. 4B is a flowchart for describing a method by which the terminals 110, 120, 130, and 140 in a group establish a session, according to an exemplary embodiment.

In operation S420, a session may be established between the first terminal 110, the second terminal 120, the fourth terminal 140, and the fourth terminal 140.

In operation S440, the first terminal 110 may periodically transmit call setup messages to announce the existence of the session.

In operation S460, no call may occur on a media plane between the first terminal 110, the second terminal 120, the third terminal 130, and the fourth terminal 140 during a pre-set time period. For example, no data may be transmitted or received between media ports of the first terminal 110, the second terminal 120, the third terminal 130, and the fourth terminal 140 during a pre-set time period.

In operation S480, the session between the first terminal 110, the second terminal 120, the third terminal 130, and the fourth terminal 140 may be terminated.

Figure 5:
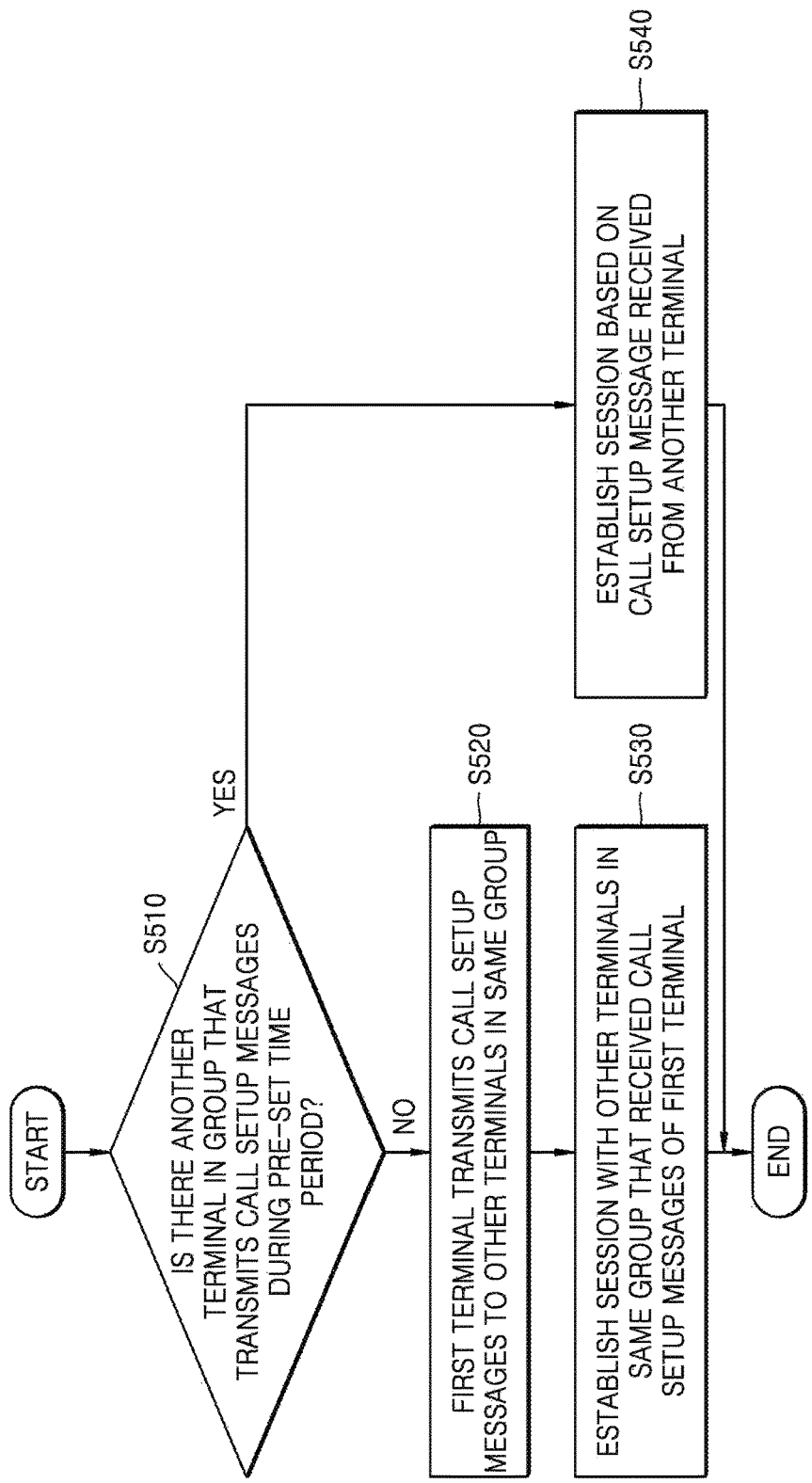
FIG. 5 is a flowchart of a method by which a first terminal according to an exemplary embodiment monitors whether call setup messages are received from other terminals in a group and establishes a session.

FIG. 5 is a flowchart for describing a method by which the first terminal 110 according to an exemplary embodiment monitors whether call setup messages are received from the other terminals 120, 130, and 140 in a group and establishes a session.

In operation S510, the first terminal 110 may monitor whether call setup messages are received from the other terminals 120, 130, and 140 in a group. For example, the first terminal 110 may monitor whether call setup messages are received from the other terminals 120, 130, and 140 in the group by using group information included in received call setup messages.

The first terminal 110 according to an exemplary embodiment may monitor whether call setup messages are received from at least one of the other terminals 120, 130, and 140 in the group during a pre-set time period. For example, ports of the plurality of terminals 110, 120, 130, and 140 in the group for transmitting and receiving call setup messages may be designated in advance. The first terminal 110 may monitor whether there is a call setup message received via a designated port during a pre-set time period.

If a call setup message is received from at least one of the other terminals 120, 130, and 140, then first terminal 110 may proceed to operation S540. If a call setup message is not received from at least one of the other terminals 120, 130, and 140, then first terminal 110 may proceed to operation S520.

In operation S520, the first terminal 110 may transmit call setup messages to the other terminals 120, 130, and 140 in the group, respectively.

The first terminal 110 according to an exemplary embodiment may transmit call setup messages to the second terminal 120, the third terminal 130, and the fourth terminal 140 via at least one of multicast and unicast. Furthermore, call setup messages may be periodically transmitted by the first terminal 110 to the second terminal 120, the third terminal 130, and the fourth terminal 140, respectively.

Meanwhile, a call setup message according to an exemplary embodiment may include information regarding a port used to transmit and receive data, codec information regarding data, information regarding an encryption key used for establishing a session, information regarding a password key used for communication security, and information regarding a port used for controlling transmission and reception of data. In another example, a call setup message may include identification information regarding a group including the first terminal 110, identification information regarding the first terminal 110, information regarding the priority of the first terminal 110 in the group, information regarding a random number generated by the first terminal 110, etc.

In operation S530, the first terminal 110 may establish a session with the other terminals 120, 130, and 140 that received call setup messages transmitted by the first terminal 110.

The first terminal 110 according to an exemplary embodiment may establish a session with the other terminals 120, 130, and 140 based on information included in the call setup messages. Furthermore, while the session is being maintained, the first terminal 110 may periodically transmit messages notifying establishment of the session to the other terminals 120, 130, and 140 in the group. For example, the first terminal 110 may periodically transmit call setup messages to the other terminals 120, 130, and 140 in the group while the session is being maintained. However, this is merely an exemplary embodiment. After a session is established, messages notifying establishment of the session may be periodically transmitted by any one of the other terminals 120, 130, and 140 in the group. Detailed descriptions thereof will be given below with reference to FIG. 24.

Meanwhile, the first terminal 110 according to an exemplary embodiment may transmit and receive data to and from the other terminals 110, 120, and 130 in the group within the session by using codec information and port information included in the call setup messages.

In operation S540, the first terminal 110 may establish a session based on a call setup message received from another terminal.

As the first terminal 110 according to an exemplary embodiment receives call setup messages from another terminal during a pre-set time period, the first terminal 110 may participate an already established session based on various parameters included in the received call setup message for establishing a session, such as a port number, a media codec number, and encryption key information.

Figure 6:
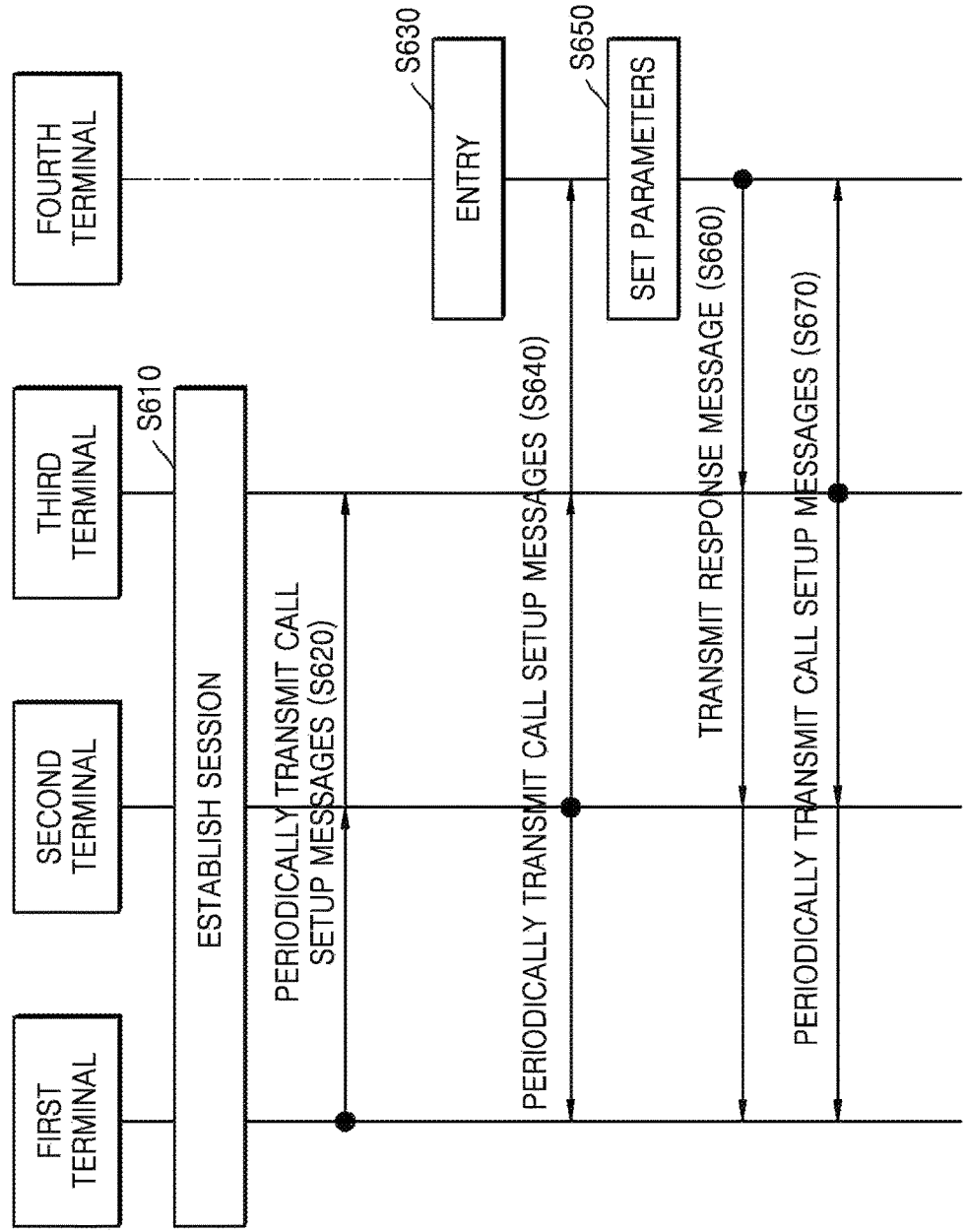
FIG. 6 is a flowchart of a method by which a first terminal establishes a session with other terminals in a group based on whether there is an already established session, according to an exemplary embodiment.

FIG. 6 is a flowchart for describing a method by which the first terminal 110 establishes a session with the other terminals 120, 130, and 140 in a group based on whether there is an already established session, according to an exemplary embodiment.

In operation S610, a session may be established between the first terminal 110, the second terminal 120, and the third terminal 130.

In operation S620, the first terminal 110 may periodically transmit call setup messages to announce the existence of the session.

In operation S630, the fourth terminal 140 may join the session.

In operation S640, the second terminal 120 may periodically transmit call setup messages to announce the existence of the session. Meanwhile, the fourth terminal 140 that joined the session in the operation S630 may receive a call setup message transmitted by the second terminal 120.

In operation S650, the fourth terminal 140 may set parameters for joining the session based on the call setup message received from the second terminal 120.

In operation S660, the fourth terminal 140 may transmit response messages to the other terminals 110, 120, and 130. The fourth terminal 140 may join the session established between the first terminal 110, the second terminal 120, and the third terminal 130.

In operation S670, the third terminal 130 may periodically transmit call setup messages to announce the existence of the session.

Figure 7:
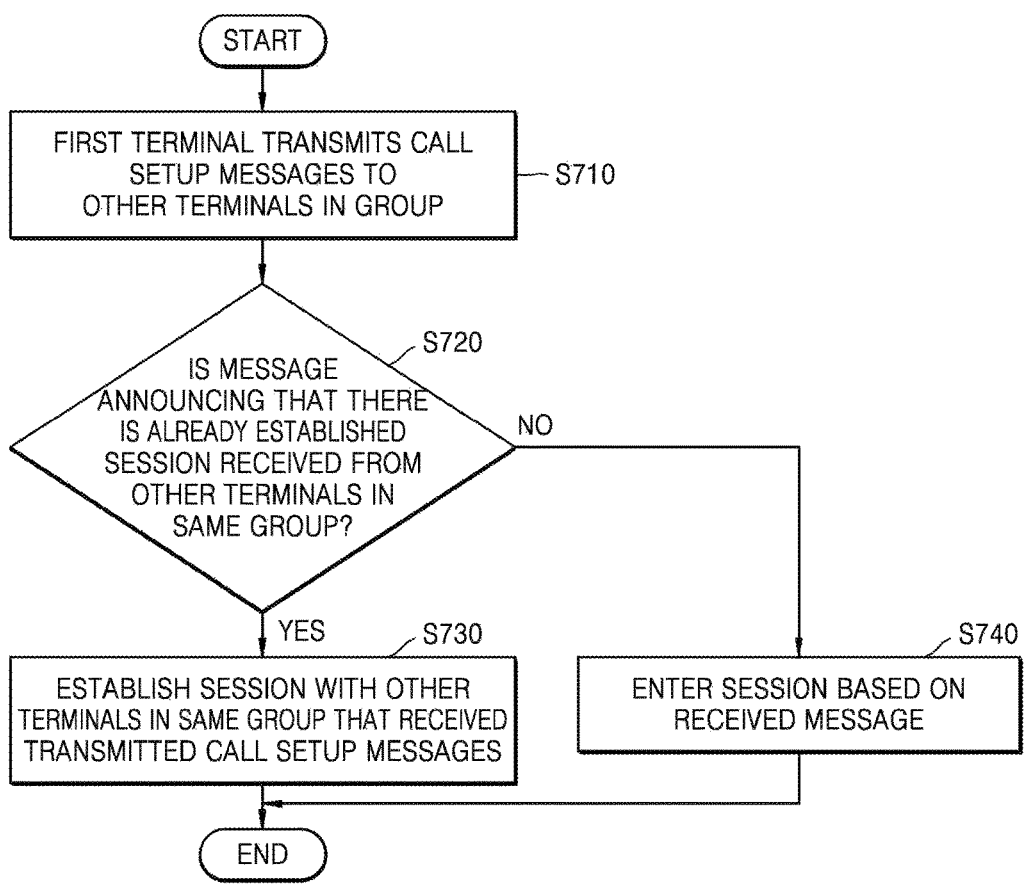
FIG. 7 is a flowchart of a method by which a first terminal establishes a session with other terminals in a group based on whether there is an already established session, according to an exemplary embodiment.

FIG. 7 is a flowchart for describing a method by which the first terminal 110 establishes a session with the other terminals 120, 130, and 140 in a group based on whether there is an already established session, according to an exemplary embodiment.

In operation S710, the first terminal 110 may transmit call setup messages to the other terminals 120, 130, and 140 in the group, respectively.

The first terminal 110 according to an exemplary embodiment may transmit call setup messages to the second terminal 120, the third terminal 130, and the fourth terminal 140 via at least one of multicast and unicast. Furthermore, call setup messages may be periodically transmitted by the first terminal 110 to the second terminal 120, the third terminal 130, and the fourth terminal 140, respectively.

Meanwhile, a call setup message according to an exemplary embodiment may include information regarding a port used to transmit and receive data, codec information regarding data, information regarding an encryption key used for establishing a session, information regarding a password key used for communication security, and information regarding a port used for controlling transmission and reception of data. In another example, a call setup message may include identification information regarding a group including the first terminal 110, identification information regarding the first terminal 110, information regarding the priority of the first terminal 110 in the group, information regarding a random number generated by the first terminal 110, etc.

In operation S720, the first terminal 110 may determine whether a message notifying the existence of an already established session is received from the other terminals 120, 130, and 140 in the group. If a message notifying the existence of an already established session is received, then first terminal 110 may proceed to operation S730, as described in further detail below. If a message notifying the existence of an already established session is not received, then first terminal 110 may proceed to operation S740, as described in further detail below.

According to an exemplary embodiment, a session may have been already established between the terminals 110, 120, 130, and 140 in the group. The terminals 120, 130, and 140 in the group that received call setup messages from the first terminal 110 may determine whether there is an already established session. For example, the second terminal 120, the third terminal 130, and the fourth terminal 140 that received call setup messages from the first terminal 110 may determine whether there is a session already established with the first terminal 110.

Meanwhile, according to an exemplary embodiment, the second terminal 120, the third terminal 130, and the fourth terminal 140 that received call setup messages may select an arbitrary wait time for transmitting a call setup decline message notifying the existence of the already established session within a pre-set range. After a time period corresponding to the selected value is elapsed from a time point at which a call setup decline message is received, the second terminal 120 may transmit call setup decline messages to the other terminals 110, 130, and 140 in the group. For example, the second terminal 120 may transmit call setup decline messages to the first terminal 110, the third terminal 130, and the fourth terminal 140, respectively.

Meanwhile, if the call setup messages received from the second terminal 120 are identical to call setup messages to be transmitted by the third terminal 130 and the fourth terminal 140, the third terminal 130 and the fourth terminal 140 may not transmit the call setup messages to the first terminal 110.

As a call setup decline message is received from the second terminal 120, the first terminal 110 according to an exemplary embodiment may determine that there is an already established session. Because there is an already established session, the first terminal 110 may stop establishing a session.

In operation S730, the first terminal 110 may establish a session with the other terminals 120, 130, and 140 in the group that received call setup messages transmitted by the first terminal 110.

Because no call setup decline message is received from at least one of the other terminals 120, 130, and 140 in the group that received call setup messages transmitted by the first terminal 110, the first terminal 110 according to an exemplary embodiment may establish a session with the other terminals 120, 130, and 140 in the group.

The first terminal 110 according to an exemplary embodiment may establish a session with the other terminals 120, 130, and 140 in the group based on information included in call setup messages. Furthermore, while the session is being maintained, the first terminal 110 may periodically transmit messages notifying establishment of the session to the other terminals 120, 130, and 140 in the group. For example, the first terminal 110 may periodically transmit call setup messages to the other terminals 120, 130, and 140 in the group while the session is being maintained. However, this is merely an exemplary embodiment. After a session is established, messages notifying establishment of the session may be periodically transmitted by any one of the other terminals 120, 130, and 140 in the group. Detailed descriptions thereof will be given below with reference to FIG. 24.

Meanwhile, the first terminal 110 according to an exemplary embodiment may transmit and receive data to and from the other terminals 110, 120, and 130 in the group within the session by using codec information and port information included in call setup messages.

In operation S740, the first terminal 110 may establish a session based on received messages.

The first terminal 110 may receive information regarding an already established session from any one of the other terminals 120, 130, and 140 in the group. For example, the first terminal 110 may participate the already established session based on various parameters included in the received messages for establishing a session, such as a port number, a media codec number, and encryption key information.

Figure 8:
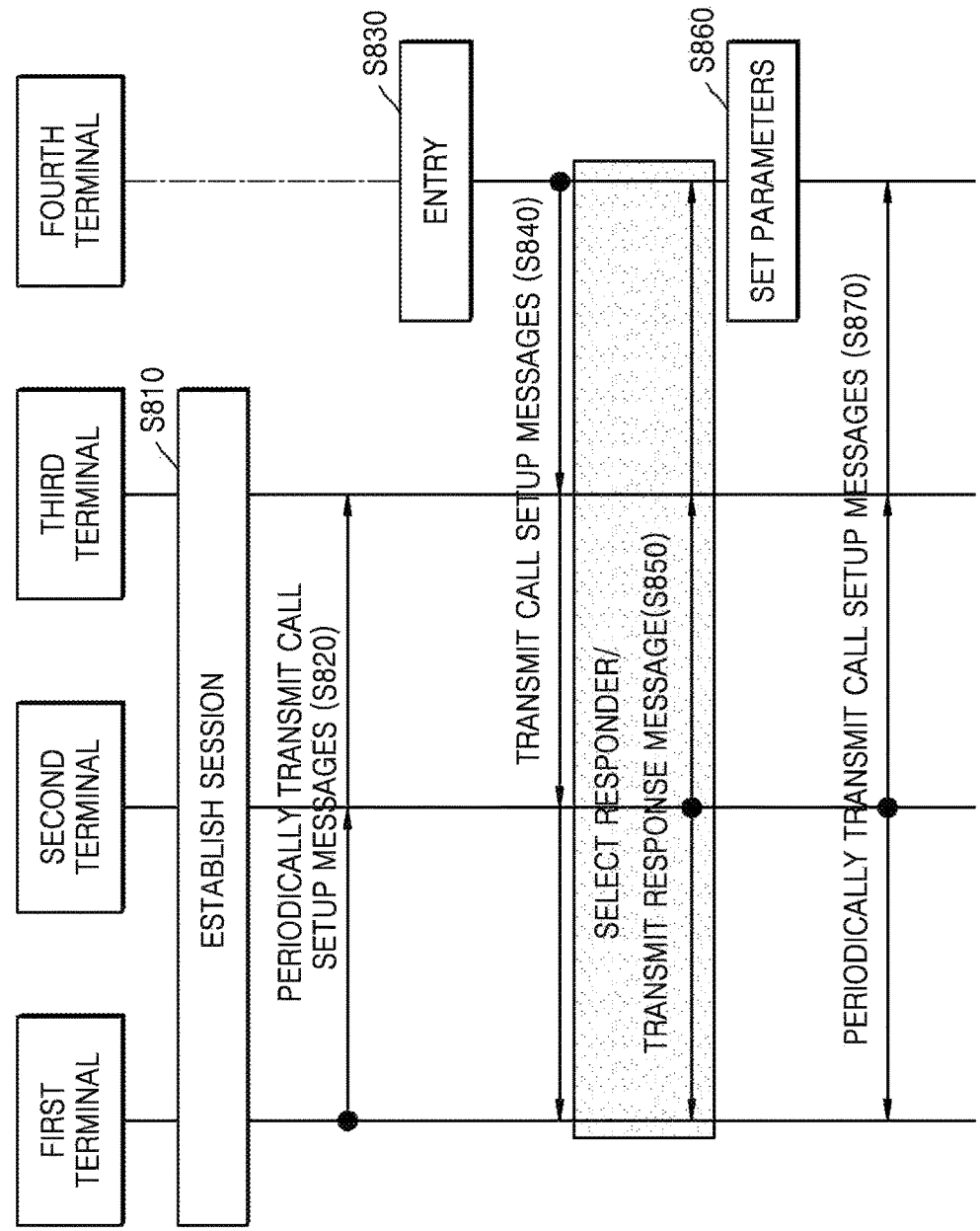
FIG. 8 is a flowchart of a method by which a first terminal establishes a session with other terminals in a group, according to another exemplary embodiment.

FIG. 8 is a flowchart for describing a method by which the first terminal 110 establishes a session with the other terminals 120, 130, and 140 in a group, according to another exemplary embodiment.

In operation S810, a session may be established between the first terminal 110, the second terminal 120, and the third terminal 130.

In operation S820, the first terminal 110 may periodically transmit call setup messages to announce the existence of the session.

In operation S830, the fourth terminal 140 may join the session.

In operation S840, the fourth terminal 140 may transmit a call setup message for establishing a session.

In operation S850, any one of the first terminal 110, the second terminal 120, and the third terminal 130 (e.g., the second terminal 120) may transmit a response message regarding the call setup message.

To prevent duplicated transmission and reception of same messages in the group, the terminals 110, 120, and 130 according to an exemplary embodiment may transmit response messages including information regarding the established session after random back-off periods. Here, a random back-off period may be randomly selected within a range from 0 round-trip time (RTT) to 0.5 RTT with respect to each of the terminals 110, 120, 130, and 140 in the group.

If the second terminal 120 according to an exemplary embodiment does not receive a call setup accept message including same information as a call setup accept message generated by the second terminal 120 from the other terminals 110, 130, and 140 in the group during a random back-off period, the second terminal 120 may transmit call setup accept messages generated by the second terminal 120 to the other terminals 110, 130, and 140 in the group.

Meanwhile, in another example, if the second terminal 120 according to an exemplary embodiment receives a call setup accept message including same information as a call setup accept message generated by the second terminal 120 from another terminal (e.g., the third terminal 130) in the group before a random back-off period is terminated, the second terminal 120 may not transmit call setup accept messages to the other terminals 110, 130, and 140 in the group.

In operation S860, the fourth terminal 140 may set parameters for joining the session based on a received response message.

In operation S870, the second terminal 120 may periodically transmit call setup messages to announce the existence of the session.

Figure 9:
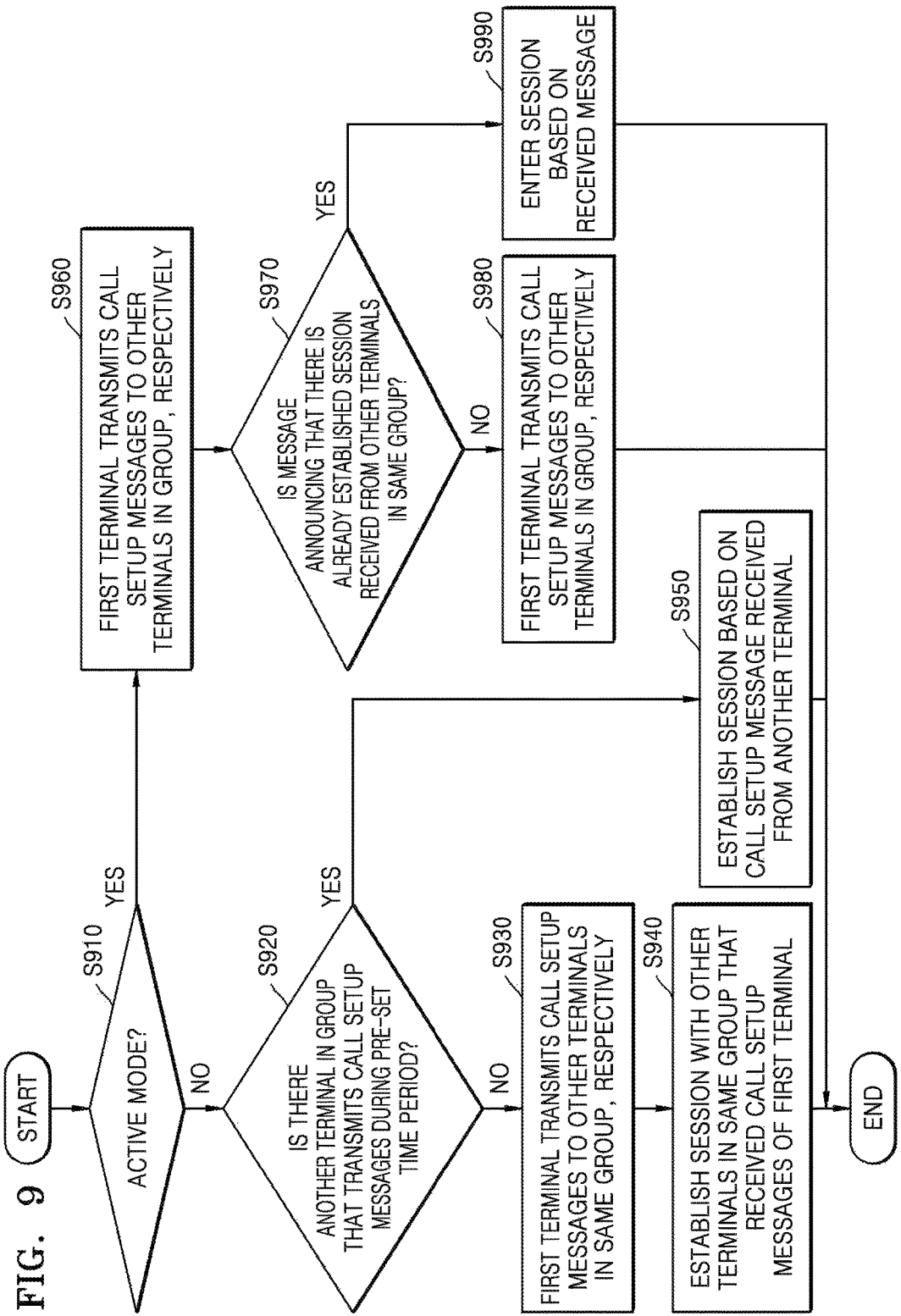
FIG. 9 is a flowchart of a method by which a first terminal establishes a session with other terminals in a group, according to another exemplary embodiment.

FIG. 9 is a flowchart for describing a method by which the first terminal 110 establishes a session with the other terminals 120, 130, and 140 in a group, according to another exemplary embodiment.

In operation S910, the first terminal 110 may determine whether a session establishing mode is an active mode. If a session establishing mode is determined to be an active mode, then first terminal 110 may proceed to operation S960, as described below. If a session establishing mode is determined not to be an active mode, then first terminal 110 may proceed to operation S920.

In operation S920, the first terminal 110 may monitor whether call setup messages are received from the other terminals 120, 130, and 140 in a group during a pre-set time period. For example, the first terminal 110 may monitor whether call setup messages are received from the other terminals 120, 130, and 140 in the group by using group information included in received call setup messages. If a call setup message is received during the pre-set time period, then first terminal 110 may proceed to operation S950, as described below. If a call setup message is not received during the pre-set time period, then first terminal 110 may proceed to operation S930.

In operation S930, the first terminal 110 may transmit call setup messages to the other terminals 120, 130, and 140 in the group.

If there is no other terminal in the group transmitting a call setup message during a pre-set time period, the first terminal 110 according to an exemplary embodiment may transmit a call setup message.

In operation S940, the first terminal 110 may establish a session with the other terminals 120, 130, and 140 that received call setup messages transmitted by the first terminal 110.

In operation S950, as a call setup message is received from another terminal during a pre-set time period, the first terminal 110 may establish a session based on the call setup message received from the other terminal.

In operation S960, the first terminal 110 may transmit call setup messages to the other terminals 120, 130, and 140 in the group.

In operation S970, the first terminal 110 may determine whether a message notifying the existence of an already established session is received. If a message notifying the existence of an already established session is received, then first terminal 110 may proceed to operation S990, as described below. If a message notifying the existence of an already established session is not received, then first terminal 110 may proceed to operation S980.

In operation S980, since no message notifying the existence of an already established session is received, the first terminal 110 may establish a session with the other terminals 120, 130, and 140 in the group that received call setup messages transmitted by the first terminal 110.

In operation S990, the first terminal 110 may join an already established session in the group based on a message received from another terminal.

Figure 10:
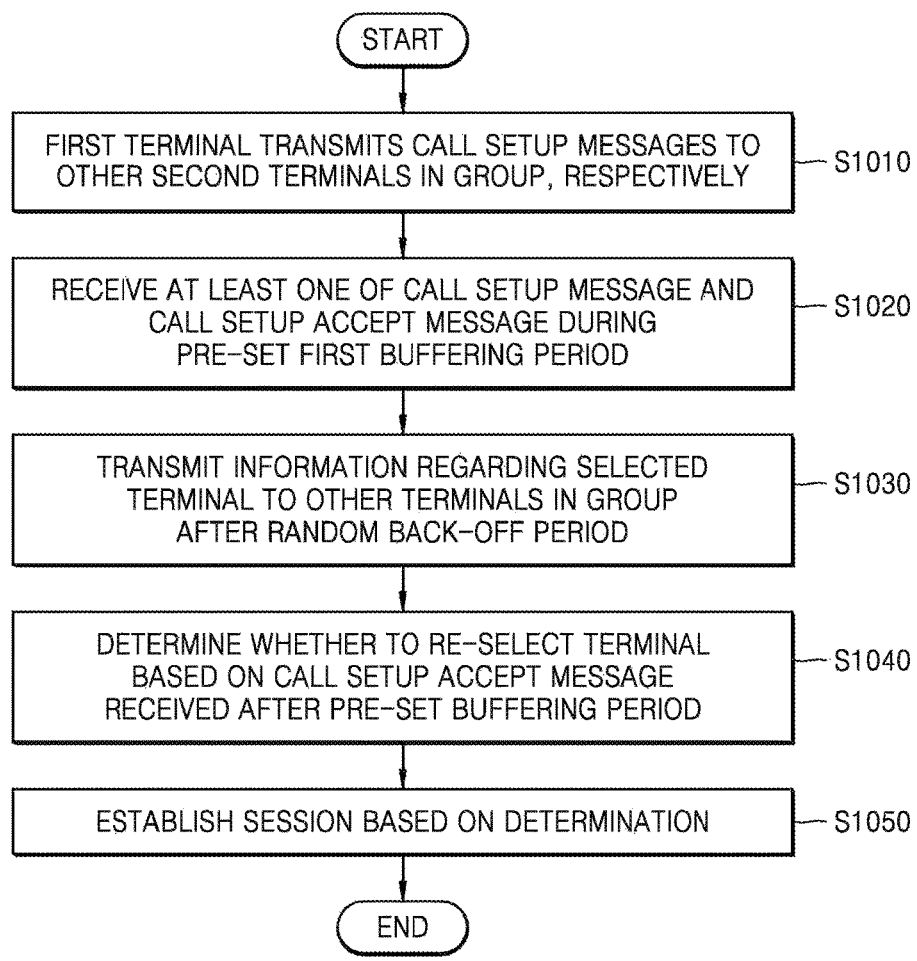
FIG. 10 is a flowchart of a method of establishing a session between terminals based on race conditions, according to an exemplary embodiment.

FIG. 10 is a flowchart for describing a method of establishing a session between the terminals 110, 120, 130, and 140 based on race conditions, according to an exemplary embodiment.

In operation S1010, the first terminal 110 may transmit call setup messages to the other terminals in a group.

The first terminal 110 according to an exemplary embodiment may monitor whether call setup messages are received from the other terminals 120, 130, and 140 in a group for a pre-set time period. For example, ports of the plurality of terminals 110, 120, 130, and 140 in the group for transmitting and receiving call setup messages may be designated in advance. The first terminal 110 may monitor whether there is a call setup message received via a designated port during a pre-set time period.

Meanwhile, the first terminal 110 may compare group information included in call setup messages received during a pre-set time period to group information regarding the first terminal 110 and determine whether a call setup message is received from at least one of the plurality of terminals 120, 130, and 140. However, group information is merely an example of information used for monitoring call setup messages, and call setup messages may be monitored by using other information included in the call setup messages.

Meanwhile, a call setup message according to an exemplary embodiment may include identification information regarding a next call controller. Here, according to an exemplary embodiment, if the first terminal 110 is a call controller, the next call controller may refer to a terminal designated as a call controller after the first terminal 110.

The first terminal 110 may designate another terminal (e.g., the second terminal 120) as a call controller, based on communication status of the first terminal 110. Detailed descriptions thereof will be given below with reference to FIG. 12.

Furthermore, if a next call controller is not determined in advance, identification information regarding a next call controller included in a call setup message may be set to 0.

If there is no call setup message received during a pre-set time period, the first terminal 110 according to an exemplary embodiment may transmit call setup messages to the other terminals 120, 130, and 140 in the group.

In operation S1020, the first terminal 110 may receive at least one call setup message and at least one call setup accept message during a pre-set first buffering period.

According to an exemplary embodiment, after call setup messages are transmitted, the first terminal 110 may monitor whether at least one of a call setup message and a call setup accept message is received from the other terminals 120, 130, and 140 in the group during the pre-set first buffering period. The first buffering period may be initiated after call setup messages are transmitted.

During the first buffering period according to an exemplary embodiment, any one of the terminals 110 and 130 that transmitted call setup messages may be selected.

Meanwhile, the first buffering period may be set to 1 RTT. However, this is merely an exemplary embodiment, and the length of the first buffering period is not limited thereto.

The first terminal 110 may select any one terminal based on at least one call setup message and at least one call setup accept message received during a buffering period. For example, the first terminal 110 may compare information regarding the priority of the third terminal 130 included in a call setup message received from the third terminal 130 to information regarding the priority regarding the first terminal 110 and select any one of the first terminal 110 and the third terminal 130. If the priority of the third terminal 130 is higher than that of the first terminal 110, the first terminal 110 may select the third terminal 130.

In operation S1030, the first terminal 110 may transmit information regarding the selected terminal to the other terminals in the group after a random back-off period.

To prevent duplicated transmission and reception of same messages in the group, the first terminal 110 according to an exemplary embodiment may transmit a call setup accept message including information regarding the determined terminal after a random back-off period. Furthermore, the call setup accept message may include at least one of identification information, priority information, and random number information regarding the terminals 110 and 130 that transmitted call setup messages. Here, a random back-off period may be randomly selected within a range from 0 RTT to 0.5 RTT with respect to each of the terminals 110, 120, 130, and 140 in the group.

If the first terminal 110 according to an exemplary embodiment receives a call setup accept message including same information as a call setup accept message generated by the first terminal 110 from another terminal (e.g., the second terminal 120) in the group before a random back-off period is terminated, the first terminal 110 may not transmit call setup accept messages to the other terminals 120, 130, and 140 in the group. In another example, if no call setup accept message including same information as a call setup accept message generated by the first terminal 110 is received from another terminal (e.g., the second terminal 120) in the group before a random back-off period is terminated, the first terminal 110 may transmit call setup accept messages to the other terminals 120, 130, and 140 in the group.

In operation S1040, the first terminal 110 may determine whether to re-select a call controller based on a call setup accept message received after a pre-set random back-off period.

In the communication system 100 according to an exemplary embodiment, there may be a call setup message that is not received by the first terminal 110 during a buffering period due to reasons including a delay or a channel degradation on a network. For example, if a call setup message transmitted by the fourth terminal 140 to the first terminal 110 may not be received by the first terminal 110 during a buffering period due to a delay on a network.

The first terminal 110 according to an exemplary embodiment may update information indicating a terminal transmitting call setup message based on a call setup accept message received from another terminal (e.g., the second terminal 120) in the group after a pre-set buffering period. For example, the first terminal 110 may receive a second call setup accept message from the second terminal 120 during a random back-off period and a pre-set updating period. Here, the pre-set updating period may be initiated after the random back-off period is terminated. Furthermore, the pre-set updating period may be 1 RTT. However, this is merely an exemplary embodiment, and the pre-set updating period is not limited thereto.

For example, a second call setup accept message received by the first terminal 110 from the second terminal 120 during a random back-off period and a pre-set updating period may include information indicating that the fourth terminal 140 from among the first terminal 110, the third terminal 130, and the fourth terminal 140 that request call setup is selected as a call controller. The first terminal 110 may compare a priority of the first terminal 110 and the fourth terminal 140 based on the second call setup accept message and update the fourth terminal 140 as a call controller.

In operation S1050, the first terminal 110 may establish a session based on a determination made as described above.

Figure 11:
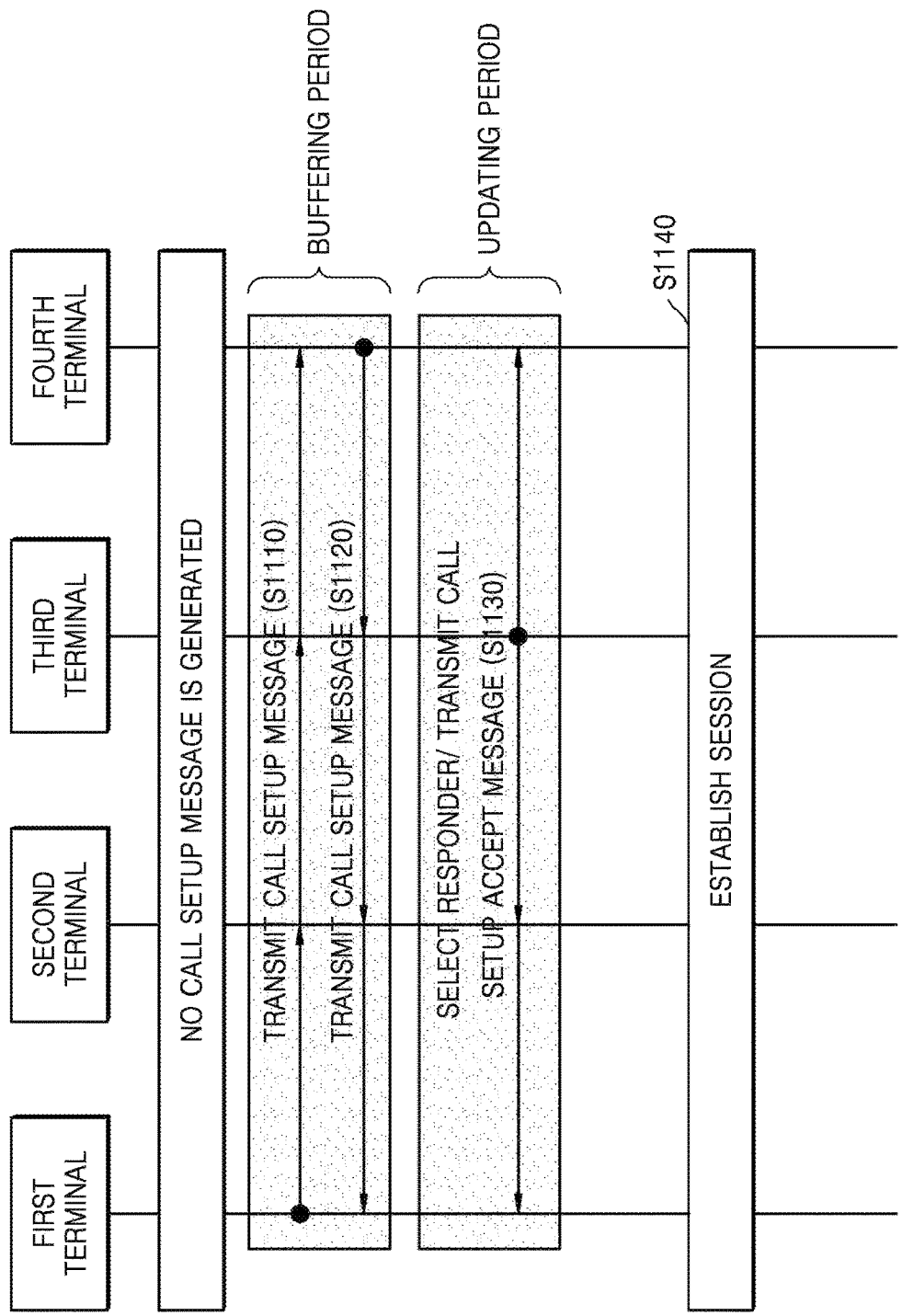
FIG. 11 is a flowchart of a method of establishing a session based on race conditions between terminals in a group according to an exemplary embodiment in closer detail.

If the fourth terminal 140 is selected, the first terminal 110 according to an exemplary embodiment may establish a session initiated by the fourth terminal 140. Furthermore, the fourth terminal 140 may periodically transmit messages announcing the establishment of the session while the session is being maintained to the other terminals 110, 120, and 130 in the group. For example, the fourth terminal 140 may periodically transmit call setup messages to the other terminals 110, 120, and 130 in the group. However, this is merely an exemplary embodiment. According to another exemplary embodiment, messages notifying establishment of the session may be periodically transmitted by any one of the other terminals 110, 120, and 130 in the group FIG. 11 is a flowchart for describing a method of establishing a session based on race conditions between the terminals 110, 130, and 140 in a group according to an exemplary embodiment in closer detail.

In operation S1110, if it is determined as a result of monitoring for a pre-set time period that no call setup message is received, the first terminal 110 may transmit call setup messages to the other terminals 120, 130, and 140 in the group. Here, a call setup message may include identification information regarding the group including the first terminal 110, identification information regarding the first terminal 110, information regarding the priority of the first terminal 110 in the group, and information regarding a random number generated by the first terminal 110.

In operation S1120, if it is determined as a result of monitoring for a pre-set time period that no call setup message is received, the fourth terminal 140 may transmit call setup messages to the other terminals 110, 120, and 130 in the group.

Here, a call setup message of the first terminal 110 and a call setup message of the fourth terminal 140 may be received during a pre-set buffering period of each of the terminals 110, 120, 130, and 140 in the group. Each of the first terminal 110, the second terminal 120, the third terminal 130, and the fourth terminal 140 may select any one of the terminals 110, 120, 130, and 140 by using at least one of priority information and random number information included in call setup messages received during a pre-set buffering period.

Meanwhile, the buffering period may be 1 RTT. However, this is merely an exemplary embodiment, and the length of the buffering period is not limited thereto. For example, the buffering period may be 1 RTT from a time point at which the second terminal 120 receives a call setup message from the first terminal 110.

Meanwhile, each of the terminals 110, 120, 130, and 140 in the group may select any one of the first terminal 110 and the fourth terminal 140 based on the call setup message of the first terminal 110 and the call setup message of the fourth terminal 140 received during a buffering period. For example, if the priority of the fourth terminal 140 is higher than the priority of the first terminal 110, the fourth terminal 140 may be selected. In another example, if the priority of the fourth terminal 140 is identical to the priority of the first terminal 110, any one of the first terminal 110 and the fourth terminal 140 may be selected based on random number information regarding the fourth terminal 140 and random number information regarding the first terminal 110.

In operation S1130, the third terminal 130 may transmit call setup accept messages including information regarding a selected terminal to the other terminals 110, 120, and 140 in the group.

Meanwhile, in the communication system 100 according to an exemplary embodiment, to prevent a feedback explosion, a terminal corresponding to the earliest random back-off period termination from among the terminals 110, 120, 130, and 140 in the group may transmit a call setup accept message. Here, the random back-off period may be initiated after a buffering period is terminated. Furthermore, random back-off periods of the terminals 110, 120, 130, and 140 may be different from one another. For example, a random back-off period may be randomly selected within a range from 0 RTT to 0.5 RTT with respect to each of the terminals 110, 120, 130, and 140 in the group.

Meanwhile, according to an exemplary embodiment, each of the terminals 110, 120, 130, and 140 in the group may determine whether a reason that the corresponding terminal selected any one of the first terminal 110 and the fourth terminal 140 is reasonable, based on call setup accept messages received during an updating period initiated after a random back-off period is terminated. Here, a call setup accept message may include information regarding call setup messages received by the respective terminals and information regarding terminals selected by the respective terminals.

In operation S1140, a session may be established between the terminals 110, 120, 130, and 140 in the group. The terminals 110, 120, 130, and 140 in the group may establish a session based on a call setup message transmitted by a terminal finally selected during an updating period.

Figure 12:
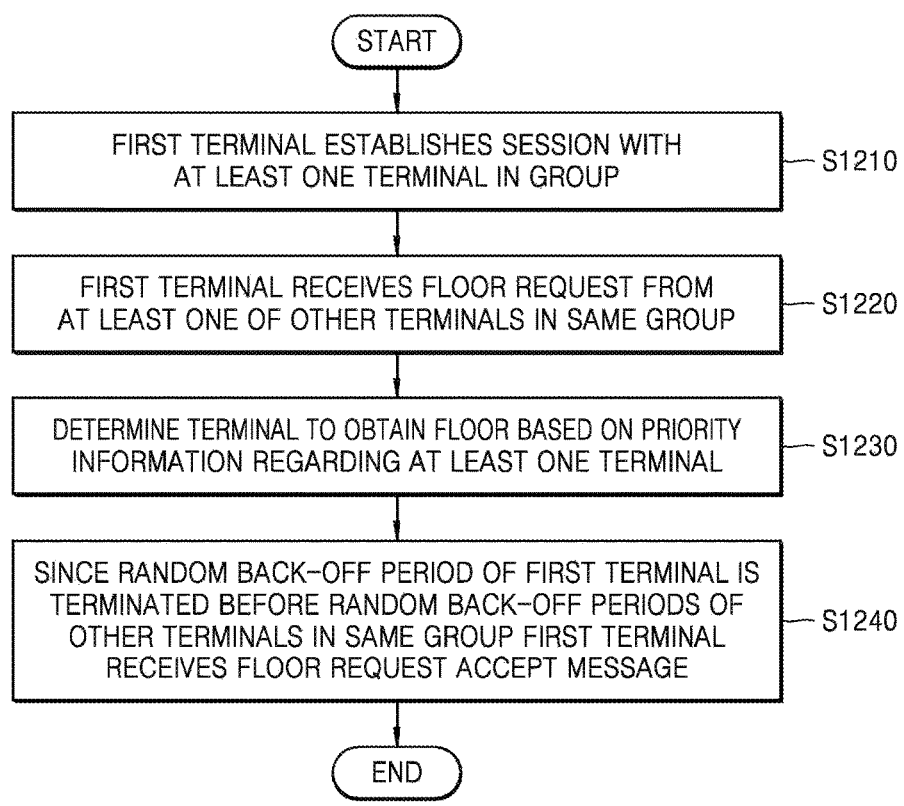
FIG. 12 is a flowchart of a method of determining a terminal having a floor in a communication system without a floor arbitrator, according to an exemplary embodiment.

FIG. 12 is a flowchart for describing a method of determining a terminal having a floor in a communication system without a floor arbitrator, according to an exemplary embodiment.

In operation S1210, the first terminal 110 may establish a session with at least one terminal in a group. Here, a method by which the first terminal 110 establishes a session with at least one terminal in the group may be any one of the methods described above with reference to FIGS. 4 through 9.

In operation S1220, the first terminal 110 may receive a floor requesting message from at least one terminal from among terminals in a session with the first terminal 110.

In operation S1230, the first terminal 110 may determine a terminal to get a floor based on priority information regarding the at least one terminal that transmitted the floor requesting message.

The first terminal 110 according to an exemplary embodiment may receive floor requesting messages from the second terminal 120 and the third terminal 130. If a floor requesting message of the second terminal 120 is received before a floor requesting message of the third terminal 130, a buffering period of the first terminal 110 may be initiated. For example, the buffering period may be 1 RTT. However, this is merely an example, and the buffering period may vary according to settings.

The first terminal 110 may determine a terminal having a floor based on floor requesting messages received during the buffering period. For example, if a floor requesting message of the third terminal 130 is received before the buffering period is terminated, the first terminal 110 may determine a terminal having a floor based on information regarding the priorities of the second terminal 120 and the third terminal 130. Furthermore, in another example, if the priority of the second terminal 120 is identical to the priority of the third terminal 130, the first terminal 110 may determine a terminal having a floor based on random number information regarding the terminals 110 and 120. Here, at least one of priority information and random number information may be included in a floor requesting message.

In another example, the first terminal 110 may determine a terminal having a floor based on respective time points at which a floor requesting message of the second terminal 120 and a floor requesting message of the third terminal 130 are received.

In operation S1240, as the random back-off period of the first terminal 110 is terminated before the random back-off periods of the other terminals 120, 130, and 140 are terminated, the first terminal 110 may transmit a floor request accept message.

The random back-off period of the first terminal 110 according to an exemplary embodiment may be initiated after the buffering period of the first terminal 110 in the operation S1230 as described above is terminated. However, this is merely an exemplary embodiment, and the random back-off period of the first terminal 110 may be initiated from a pre-set time point.

Meanwhile, a random back-off period may be randomly selected within a pre-set time range. For example, a random back-off period may be randomly selected within a range from 0 RTT to 0.5 RTT.

Figure 13:
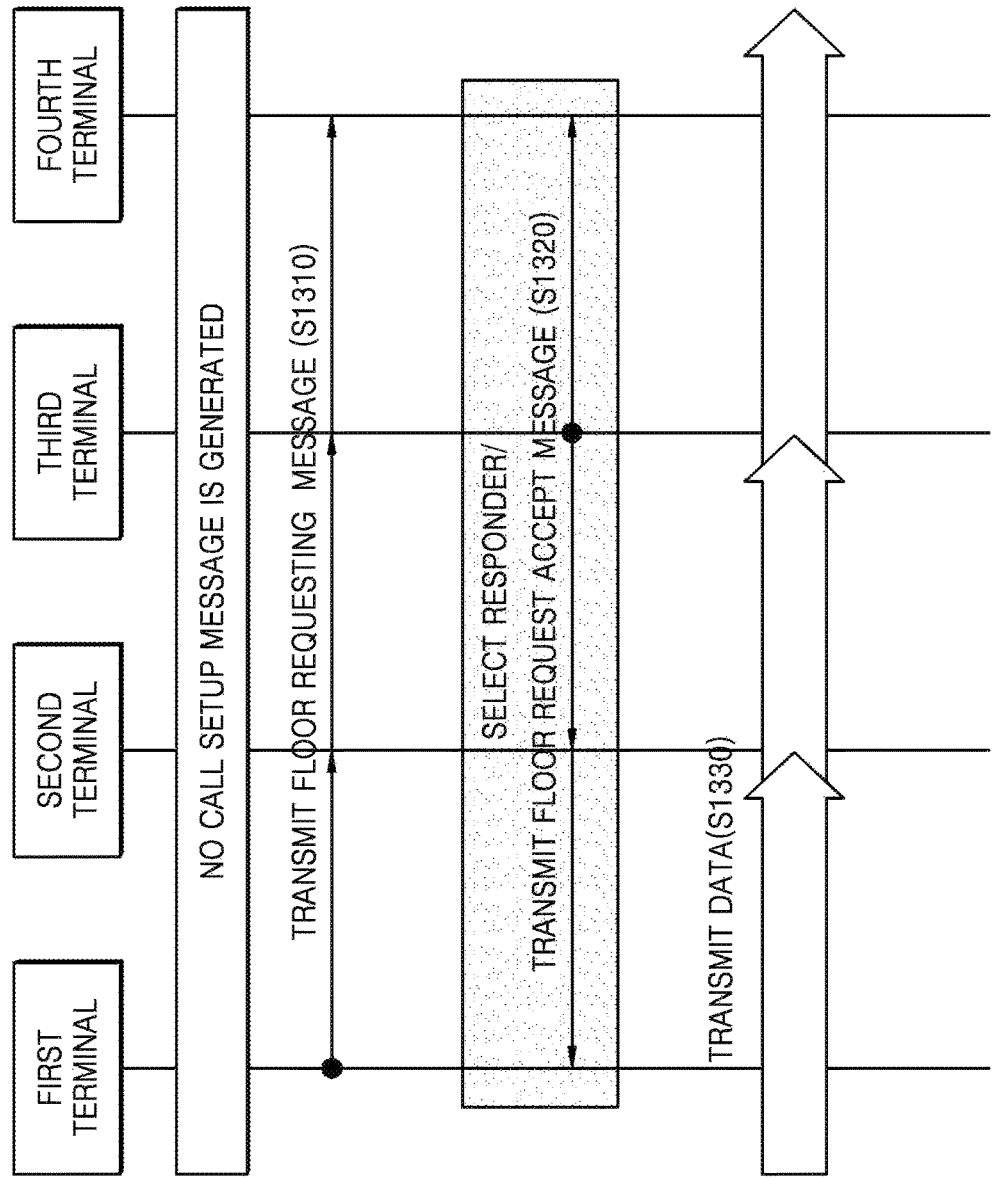
FIG. 13 is a flowchart of a method of determining a terminal having a floor as a floor requesting message is generated in a group, according to an exemplary embodiment.

FIG. 13 is a flowchart for describing a method of determining a terminal having a floor as a floor requesting message is generated in a group, according to an exemplary embodiment.

In operation S1310, the first terminal 110 may transmit floor requesting messages to the other terminals 120, 130, and 140.

In operation S1320, any one (e.g., the third terminal 130) of the second terminal 120, the third terminal 130, and the fourth terminal 140 may transmit a response message in response to the floor requesting message. Here, an example of the response message may be a floor request accept message.

To prevent transmission and reception of same messages in a group, the terminals 120, 130, and 140 according to an exemplary embodiment may transmit response messages notifying that floor request is accepted after random back-off periods are elapsed from time points at which the floor requesting messages are received. Here, a random back-off period may be randomly selected within a range from 0 RTT to 0.5 RTT with respect to each of the terminals 110, 120, 130, and 140 in the group.

As no response message is received from the other terminals 110, 120, and 140 in the group during a random back-off period, the third terminal 130 according to an exemplary embodiment may transmit response messages to the other terminals 110, 120, and 140 in the group after the random back-off period is terminated.

If a response message including information identical to information included in a response generated by the second terminal 120 is received, the second terminal 120 may transmit response messages generated by the second terminal 120 to the other terminals 110, 130, and 140 in the group.

Meanwhile, in another example, if a call setup accept message including information identical to information included in a response message generated by the second terminal 120 is received from another terminal (e.g., the third terminal 130) in the group before a random back-off period is terminated, the second terminal 120 may not transmit call setup accept messages to the other terminals 110, 130, and 140 in the group.

In operation S1330, as the first terminal 110 receives a response message indicating that a floor request is accepted, the first terminal 110 may transmit data to the other terminals 120, 130, and 140.

Figure 14:
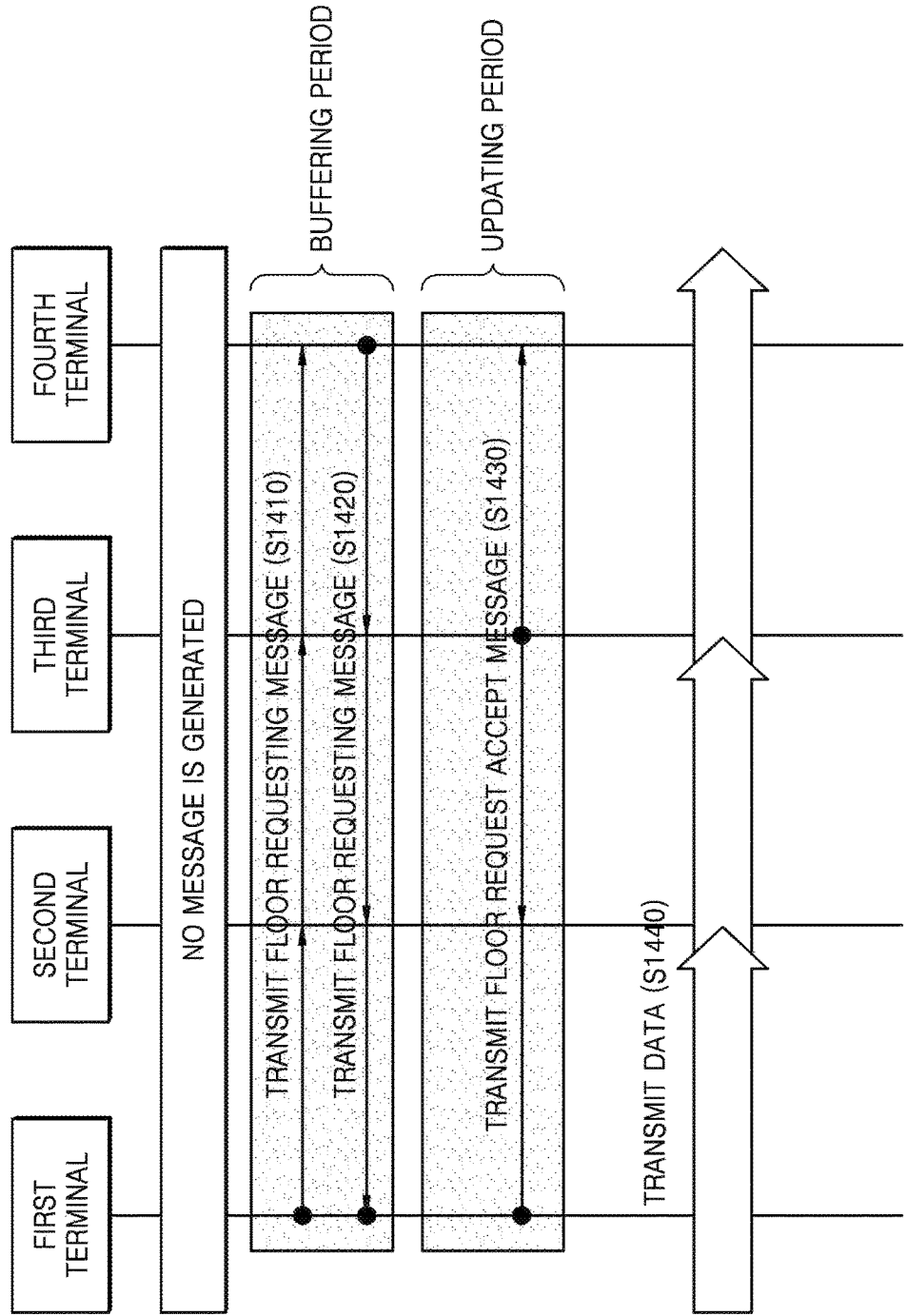
FIG. 14 is a flowchart of a method of determining a terminal having a floor as a plurality of floor requesting messages are generated in a group, according to an exemplary embodiment.

FIG. 14 is a flowchart for describing a method of determining a terminal having a floor as a plurality of floor requesting messages are generated in a group, according to an exemplary embodiment.

In operation S1410, the first terminal 110 may transmit floor requesting messages to the other terminals 120, 130, and 140 in a group. Here, a floor requesting message may include identification information regarding the group including the first terminal 110, identification information regarding the first terminal 110, information regarding the priority of the first terminal 110 in the group, and information regarding a random number generated by the first terminal 110.

In operation S1420, the fourth terminal 140 may transmit floor requesting messages to the other terminals 110, 120, and 130 in a group. Here, a floor requesting message may include identification information regarding the group including the fourth terminal 140, identification information regarding the fourth terminal 140, information regarding the priority of the fourth terminal 140 in the group, and information regarding a random number generated by the fourth terminal 140.

Here, a floor requesting message of the first terminal 110 and a floor requesting message of the fourth terminal 140 may be received during a pre-set buffering period of each of the terminals 110, 120, 130, and 140 in the group. Each of the first terminal 110, the second terminal 120, the third terminal 130, and the fourth terminal 140 may determine a terminal having a floor by using at least one of priority information and random number information included in floor requesting messages received during a pre-set buffering period.

Meanwhile, the buffering period may be 1 RTT. However, this is merely an exemplary embodiment, and the length of the buffering period is not limited thereto. For example, the buffering period may be 1 RTT from a time point at which the second terminal 120 receives a floor requesting message from the first terminal 110.

Meanwhile, each of the terminals 110, 120, 130, and 140 in the group may select any one of the first terminal 110 and the fourth terminal 140 based on the floor requesting message of the first terminal 110 and the floor requesting message of the fourth terminal 140 received during a buffering period. For example, if the priority of the fourth terminal 140 is higher than the priority of the first terminal 110, the fourth terminal 140 may be selected. In another example, if the priority of the fourth terminal 140 is identical to the priority of the first terminal 110, any one of the first terminal 110 and the fourth terminal 140 may be selected based on random number information regarding the fourth terminal 140 and random number information regarding the first terminal 110.

In operation S1430, the third terminal 130 may transmit floor request accept messages including information regarding a selected terminal to the other terminals 110, 130, and 140 in the group.

Meanwhile, in the communication system 100 according to an exemplary embodiment, to prevent a feedback explosion, a terminal corresponding to the earliest random back-off period termination from among the terminals 110, 120, 130, and 140 in the group may transmit a floor request accept message. Here, the random back-off period may be initiated after a buffering period is terminated. Furthermore, random back-off periods of the terminals 110, 120, 130, and 140 may be different from one another. For example, a random back-off period may be randomly selected within a range from 0 to 0.5 RTT with respect to each of the terminals 110, 120, 130, and 140 in the group.

Meanwhile, according to an exemplary embodiment, each of the terminals 110, 120, 130, and 140 in the group may determine whether a reason that the corresponding terminal selected any one of the first terminal 110 and the fourth terminal 140 is reasonable, based on floor request accept messages received during an updating period initiated after a random back-off period is terminated. Here, a floor request accept message may include information regarding floor requesting messages received by the respective terminals and information regarding terminals selected by the respective terminals.

In operation S1440, as floor requesting messages are received, the first terminal 110 may transmit data to the terminals 120, 130, and 140 in the group.

Figure 15:
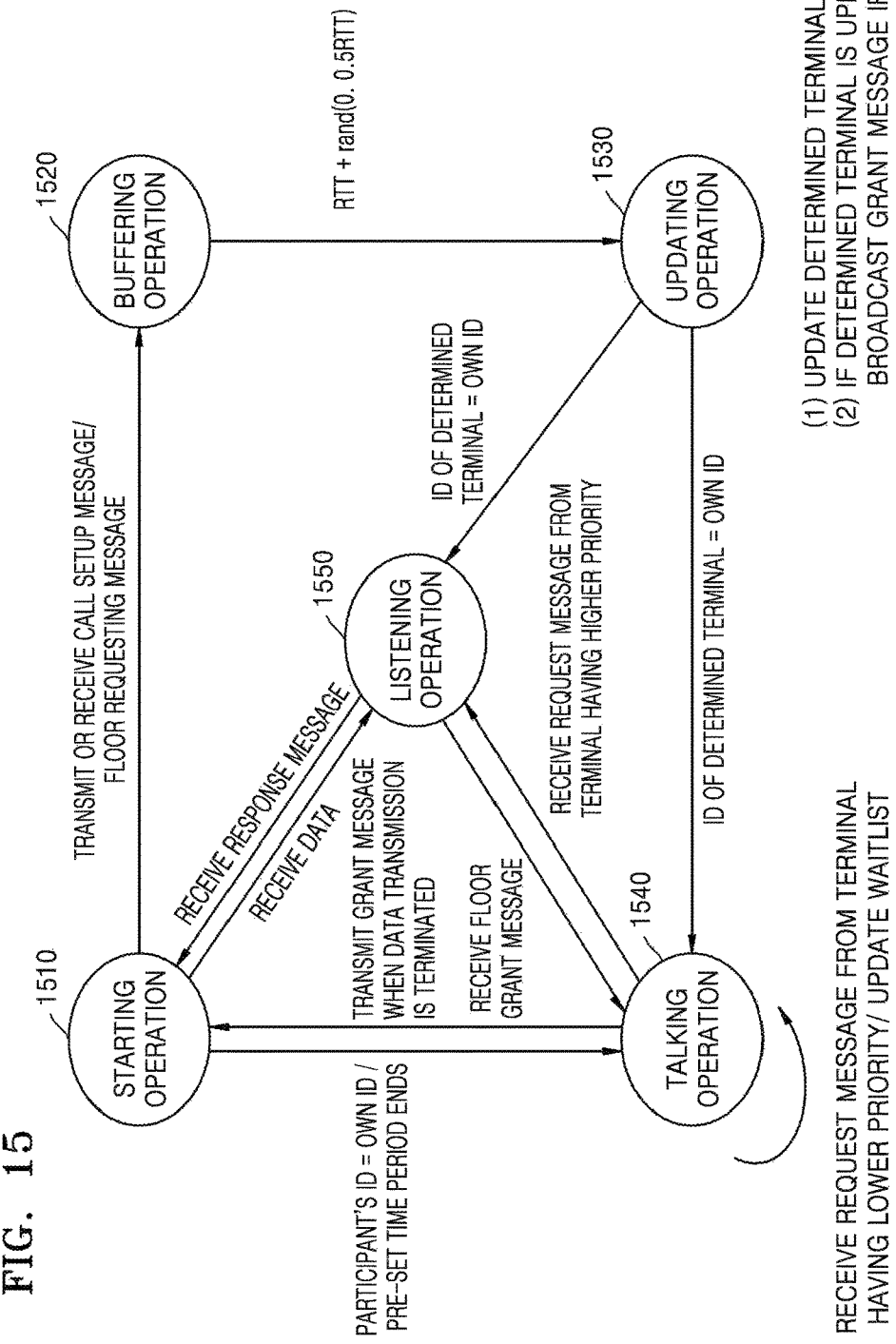
FIG. 15 is a diagram for describing a method of determining any one terminal in a case where a conflict occurs between a plurality of terminals in a communication system according to an exemplary embodiment.

FIG. 15 is a diagram for describing a method of determining any one terminal in a case where a conflict occurs between a plurality of terminals in the communication system 100 according to an exemplary embodiment. For convenience of explanation, descriptions below will be given in relation to the first terminal 110.

In an starting operation or initiating operation 1510, as the first terminal 110 transmits or receives a requesting message, a buffering operation 1520 of the first terminal 110 may be initiated. For example, the first terminal 110 may initiate a buffering operation as the first terminal 110 transmits or receives a call setup message or a floor requesting message. Furthermore, the first terminal 110 may initiate a buffering operation as the first terminal 110 receives a call setup message or a floor requesting message from another terminal in a group. However, this is merely an exemplary embodiment. If it is necessary to select one terminal in a communication system and a conflict occurs as a plurality of terminals apply thereto, terminals in a group may operate as shown in FIG. 15.

After a random back-off period arbitrarily selected by the first terminal 110 is elapsed from a time point at which the buffering operation 1520 is terminated, an updating operation 1530 may be initiated. The length of the buffering operation 1520 may be 1 RTT, for example. Furthermore, the length of a random back-off period may be arbitrarily selected within a range from 0 RTT to 0.5 RTT.

In the updating operation 1530, the first terminal 110 may receive an accept message including information regarding a terminal selected from among terminals that transmitted request messages, from at least one of the other terminals 120, 130, and 140. The first terminal 110 may update a terminal determined by the first terminal 110 based on the accept message. For example, if a terminal determined by the first terminal 110 is different from a terminal indicated by an accept message, the first terminal 110 may update the terminal determined by the first terminal 110. The first terminal 110 may transmit information regarding the updated terminal to the other terminals 120, 130, and 140.

Meanwhile, if information included in a received accept message is identical to information included in an accept message to be transmitted by the first terminal 110, the first terminal 110 may not transmit the accept messages to the other terminals 120, 130, and 140 to prevent duplication of feedback information.

In the updating operation 1530, if the determined terminal is the first terminal 110, a talking operation 1540 of the first terminal 110 may be initiated.

In the talking operation 1540, the first terminal 110 may transmit a message or data. For example, the first terminal 110 may transmit a call setup message or media data.

According to an exemplary embodiment, in the talking operation 1540, the first terminal 110 may receive a request message from another terminal in a group. The first terminal 110 may compare the priority of the terminal that transmitted the request message to the priority of the first terminal 110. If the priority of the first terminal 110 is higher than the priority of the terminal that transmitted the request message, the first terminal 110 may generate a waitlist. Information regarding the terminal that transmitted the request message may be stored in the generated waitlist.

Furthermore, when data transmission of the first terminal 110 is terminated in the talking operation 1540, the first terminal 110 may transmit a floor grant message. Therefore, the initiating operation 1510 may be initiated.

A listening operation 1550 may be initiated if a terminal determined in the updating operation 1530 is different from the first terminal 110 or a terminal having a higher priority than the first terminal 110 transmits a request message in the talking operation 1540. For example, if the floor of the first terminal 110 is revoked or a floor is granted to a terminal having a higher priority than the first terminal 110, the listening operation 1550 may be initiated.

In the listening operation 1550, if the first terminal 110 receives a release message indicating termination of a data transmission from another terminal, the method may proceed back to the initiating operation 1510. Furthermore, in the listening operation 1550, if the first terminal 110 receives a floor grant message, the talking operation 1540 may be initiated.

Meanwhile, in the initiating operation 1510, if a participant is the first terminal 110, the talking operation 1540 may be initiated after a pre-set time period. Furthermore, in the initiating operation 1510, if the first terminal 110 receives media data, the listening operation 1550 may be initiated.

Figure 16:
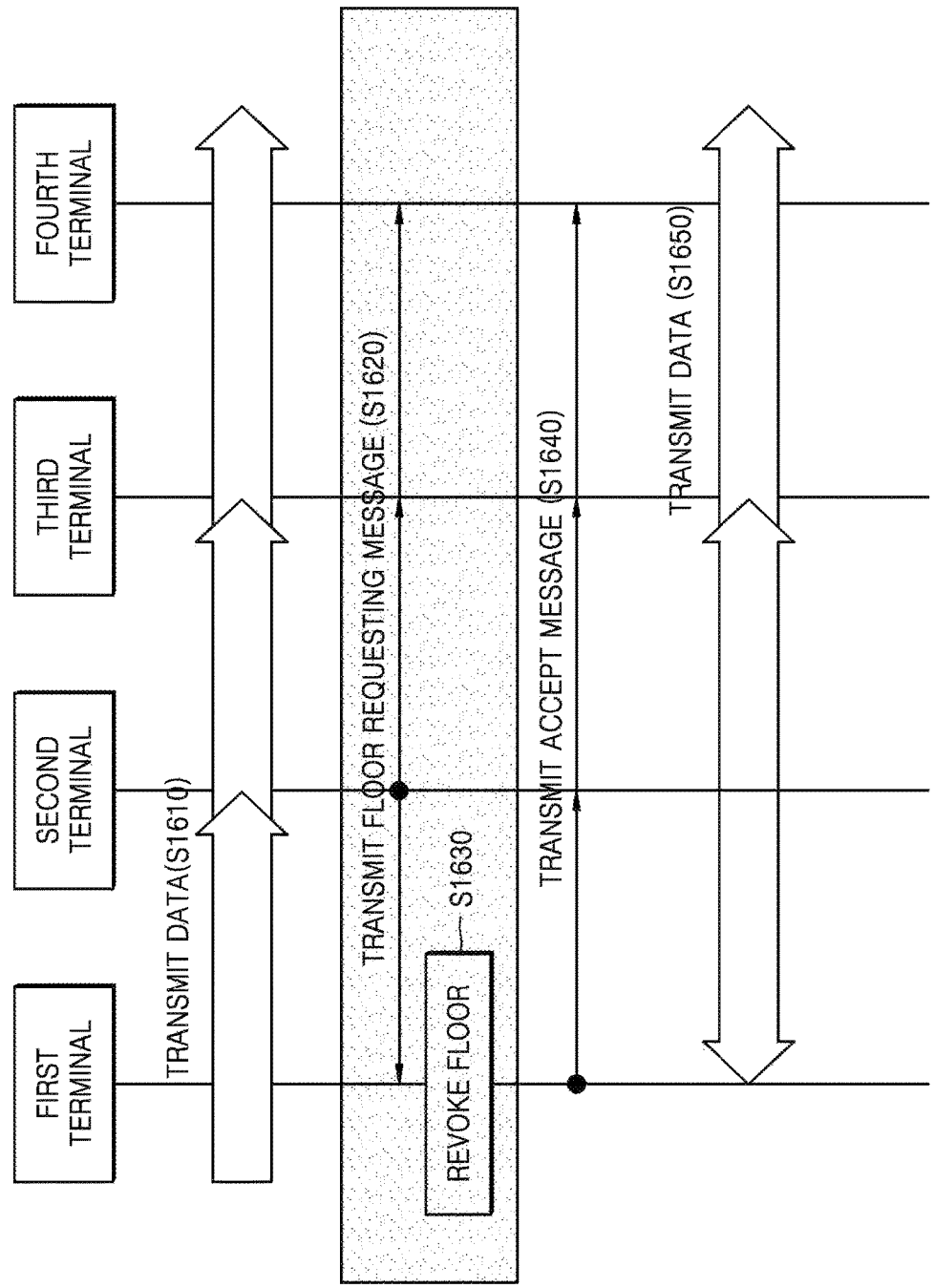
FIG. 16 is a flowchart of a method of determining a terminal having a floor in a case where a floor requesting message is received from a terminal having a higher priority than a first terminal during data transmission of the first terminal, according to an exemplary embodiment.

FIG. 16 is a flowchart for describing a method of determining terminal having a floor in case where a floor requesting message is received from the terminal 120 having a higher priority than the first terminal 110 during data transmission of the first terminal 110, according to an exemplary embodiment.

In operation S1610, the first terminal 110 may transmit data to the other terminals 120, 130, and 140 in a group. Here, the first terminal 110 may be a terminal that obtained a floor.

In operation S1620, the second terminal 120 may transmit floor requesting messages to the other terminals 110, 130, and 140 in the group.

In operation S1630, the first terminal 110 may revoke the floor of the first terminal 110. Here, it is assumed that the priority of the second terminal 120 is higher than the priority of the first terminal 110.

In operation S1640, the first terminal 110 may transmit accept messages for accepting the floor of the second terminal 120 to the other terminals 120, 130, and 140.

In operation S1650, the second terminal 120 may transmit data. The second terminal 120 may receive floor requesting messages from at least one of the other terminals 110, 130, and 140 in the group during a data transmission of the second terminal 120.

Figure 17:
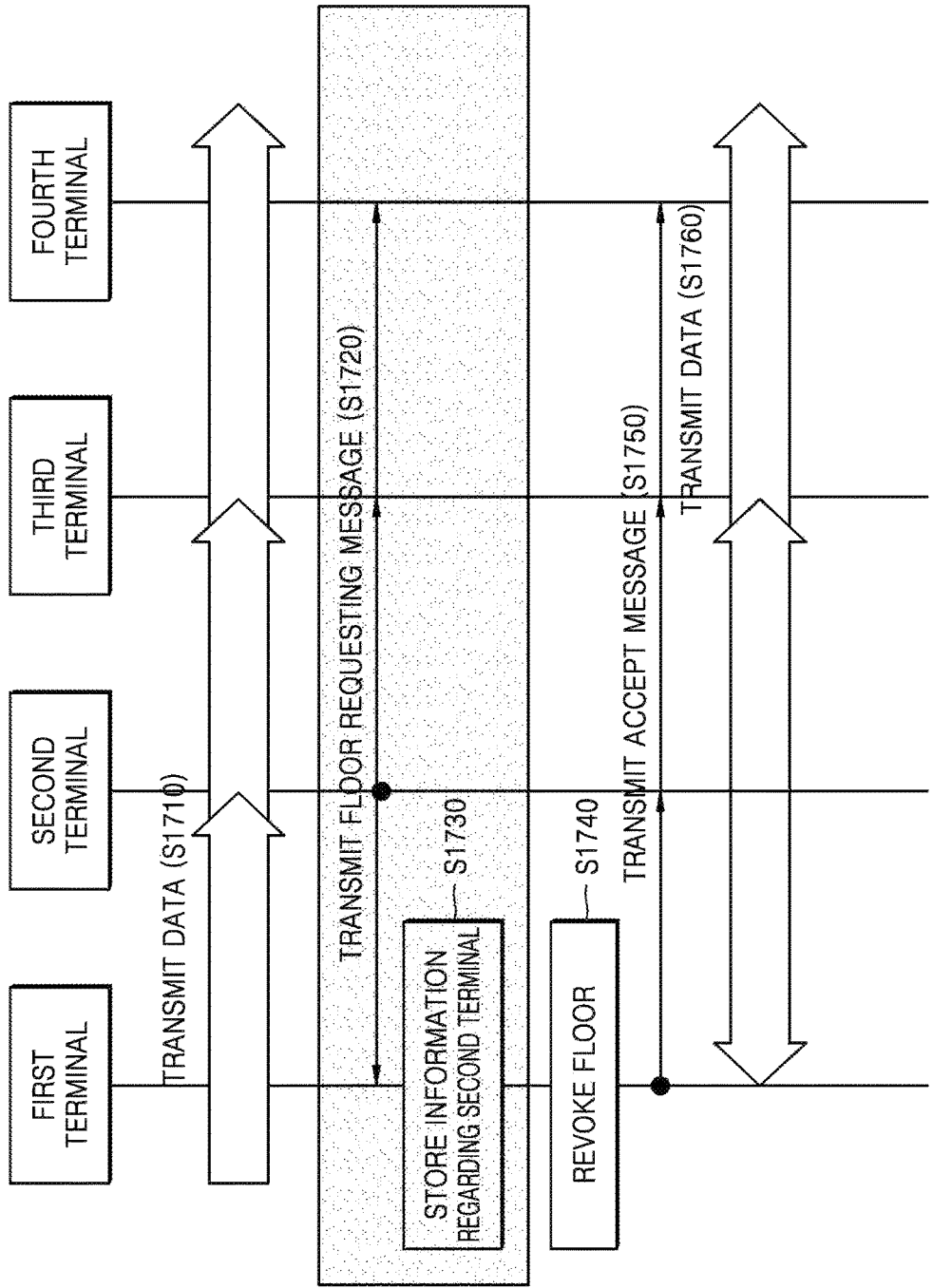
FIG. 17 is a flowchart of a method of determining a terminal having a floor in a case where a floor requesting message is received from a terminal having a lower priority than a first terminal during data transmission of the first terminal, according to an exemplary embodiment.

FIG. 17 is a flowchart for describing a method of determining terminal having a floor in case where a floor requesting message is received from the terminal 120 having a lower priority than the first terminal 110 during data transmission of the first terminal 110, according to an exemplary embodiment.

In operation S1710, the first terminal 110 may transmit data to the other terminals 120, 130, and 140 in a group. Here, the first terminal 110 may be a terminal that obtained a floor.

In operation S1720, the second terminal 120 may transmit floor requesting messages to the other terminals 110, 130, and 140 in the group.

In operation S1730, the first terminal 110 may store information regarding the second terminal 120. Here, it is assumed that the priority of the second terminal 120 is lower than the priority of the first terminal 110.

In operation S1740, as the data transmission is terminated, the first terminal 110 may release its floor.

In operation S1750, the first terminal 110 may transmit accept messages for accepting the floor of the second terminal 120 to the other terminals 120, 130, and 140.

In operation S1760, the second terminal 120 may transmit data to the other terminals 110, 130, and 140 in the group.

Figure 18:
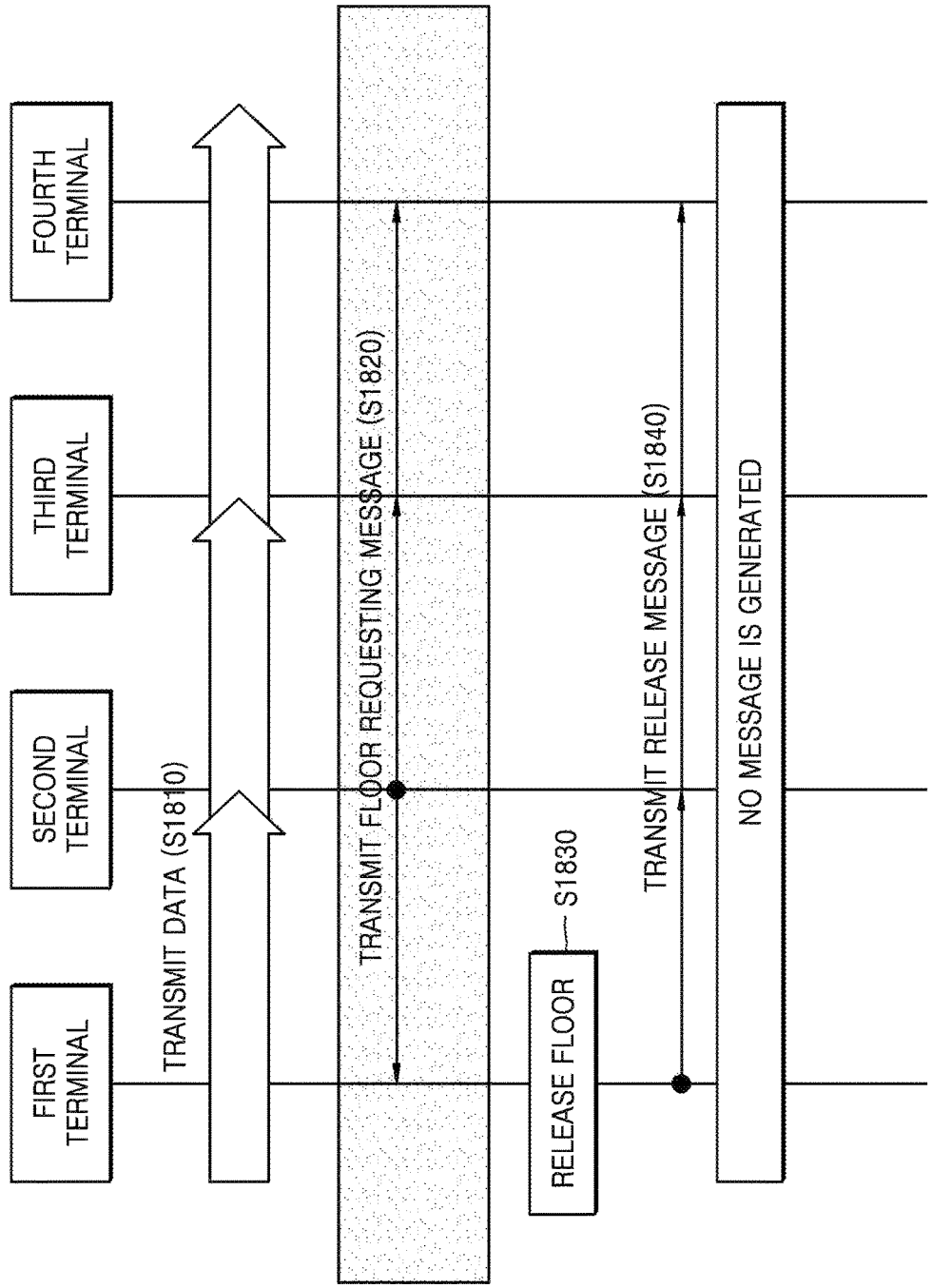
FIG. 18 is a flowchart of a method of determining a terminal having a floor in a case where the first terminal according to an exemplary embodiment does not generate a waitlist.

FIG. 18 is a flowchart for describing a method of determining a terminal having a floor in case where the first terminal 110 according to an exemplary embodiment does not generate a waitlist.

In operation S1810, the first terminal 110 may transmit data to the other terminals 120, 130, and 140 in a group. Here, the first terminal 110 may be a terminal that obtained a floor.

In operation S1820, the second terminal 120 may transmit floor requesting messages to the other terminals 110, 130, and 140 in the group. Meanwhile, it is assumed that the priority of the second terminal 120 is lower than the priority of the first terminal 110. Therefore, the second terminal 120 is unable to obtain a floor until the data transmission of the first terminal 110 is terminated.

In operation S1830, as the data transmission of the first terminal 110 is terminated, the first terminal 110 may release its floor.

In operation S1840, the first terminal 110 may transmit a release message notifying that the floor of the first terminal 110 is released.

Figure 19:
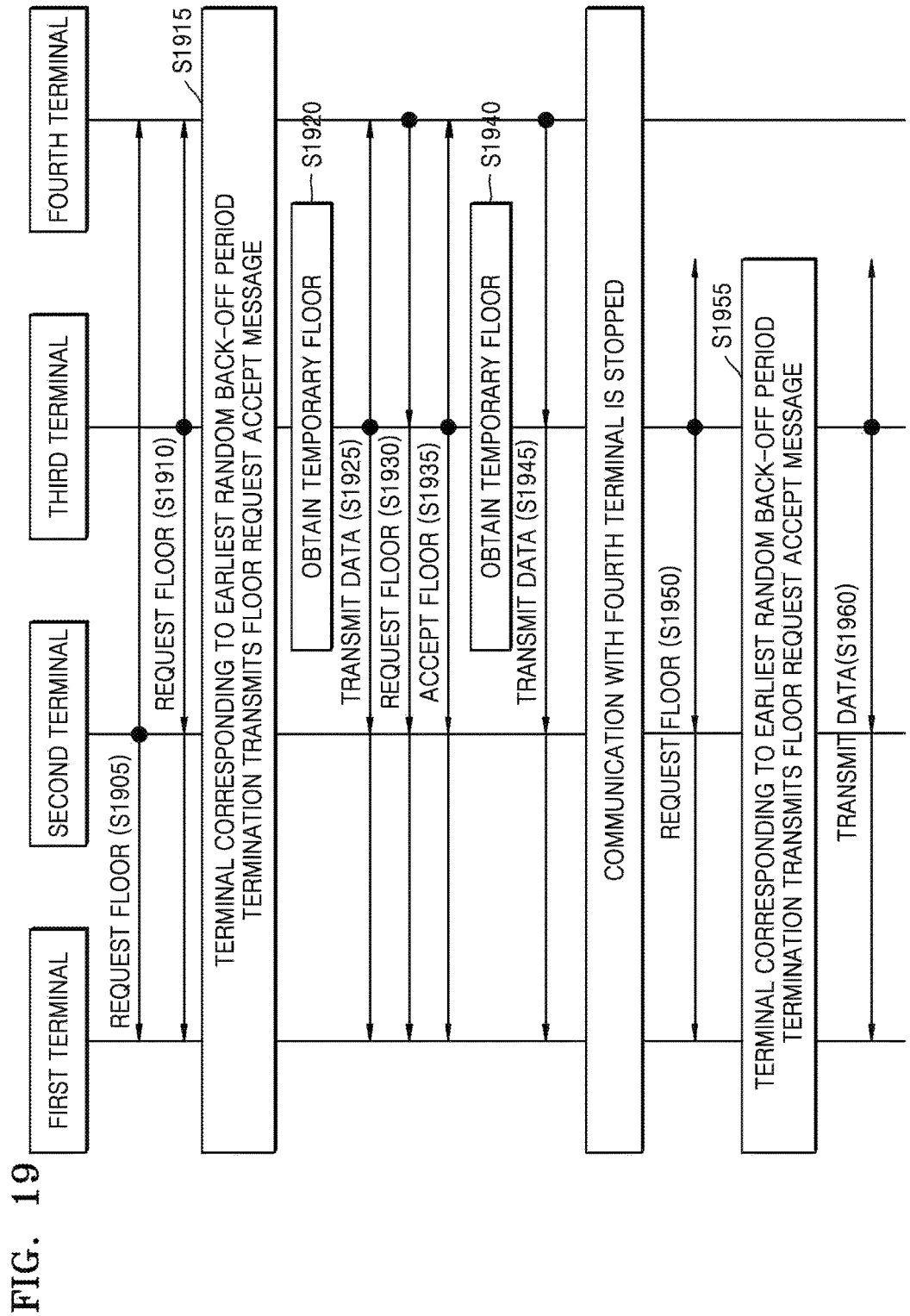
FIG. 19 is a flowchart of a method by which terminals in a group obtain temporary floors, according to an exemplary embodiment.

FIG. 19 is a flowchart for describing a method by which the terminals 110, 120, 130, and 140 in a group obtain temporary floors, according to an exemplary embodiment.

In operation S1905, the second terminal 120 may transmit floor requesting messages to the other terminals 110, 130, and 140 in the group.

In operation S1910, the third terminal 130 may transmit floor requesting messages to the other terminals 110, 120, and 140 in the group.

In operation S1915, a terminal corresponding to an earliest random back-off period termination from among the terminals 110, 120, 130, and 140 in the group may transmit a floor request accept message.

According to an exemplary embodiment, each of the terminals 110, 120, 130, and 140 may determine a terminal having a floor based on floor requesting messages received from the second terminal 120 and the third terminal 130. According to an exemplary embodiment, the terminals 110, 120, 130, and 140 in the group may determine the third terminal 130 having a higher priority by using priority information included in the floor requesting messages. According to another exemplary embodiment, if the priority of the second terminal 120 is identical to the priority of the third terminal 130, the terminals 110, 120, 130, and 140 in the group may select any one of the second terminal 120 and the third terminal 130 based on random number information regarding the second terminal 120 and the third terminal 130.

Meanwhile, for example, if the random back-off period of the first terminal 110 is terminated before the random back-off periods of the other terminals 120, 130, and 140 in the group are terminated, the first terminal 110 may transmit floor request accept messages regarding the third terminal 130 to the other terminals 120, 130, and 140.

In operation S1920, the third terminal 130 may obtain a temporary floor by receiving the floor request accept message.

In operation S1925, the third terminal 130 may transmit data to the other terminals 110, 120, and 140 in the group.

In operation S1930, the fourth terminal 140 may transmit floor requesting messages to the other terminals 110, 120, and 130 in the group.

In operation S1935, the third terminal 130 may transmit accept messages for accepting the floor of the fourth terminal 140 to the other terminals 110, 120, and 140. Here, the data transmission of the third terminal 130 may be stopped.

In operation S1940, the fourth terminal 140 may obtain a temporary floor.

In operation S1945, the fourth terminal 140 may transmit data to the other terminals 110, 120, and 130 in the group.

In operation S1950, the third terminal 130 may transmit floor requesting messages to the other terminals 110, 120, and 140. As no data is received from the fourth terminal 140 for a pre-set time period or longer, the first terminal 110, the second terminal 120, and the third terminal 130 in the group may determine that a communication with the fourth terminal 140 is stopped.

In operation S1955, either the first terminal 110 or the second terminal 120 corresponding to an earlier random back-off period termination may transmit a floor request accept message.

In operation S1960, the third terminal 130 may transmit data to the other terminals 110, 120, and 140 in the group.

Figure 20:
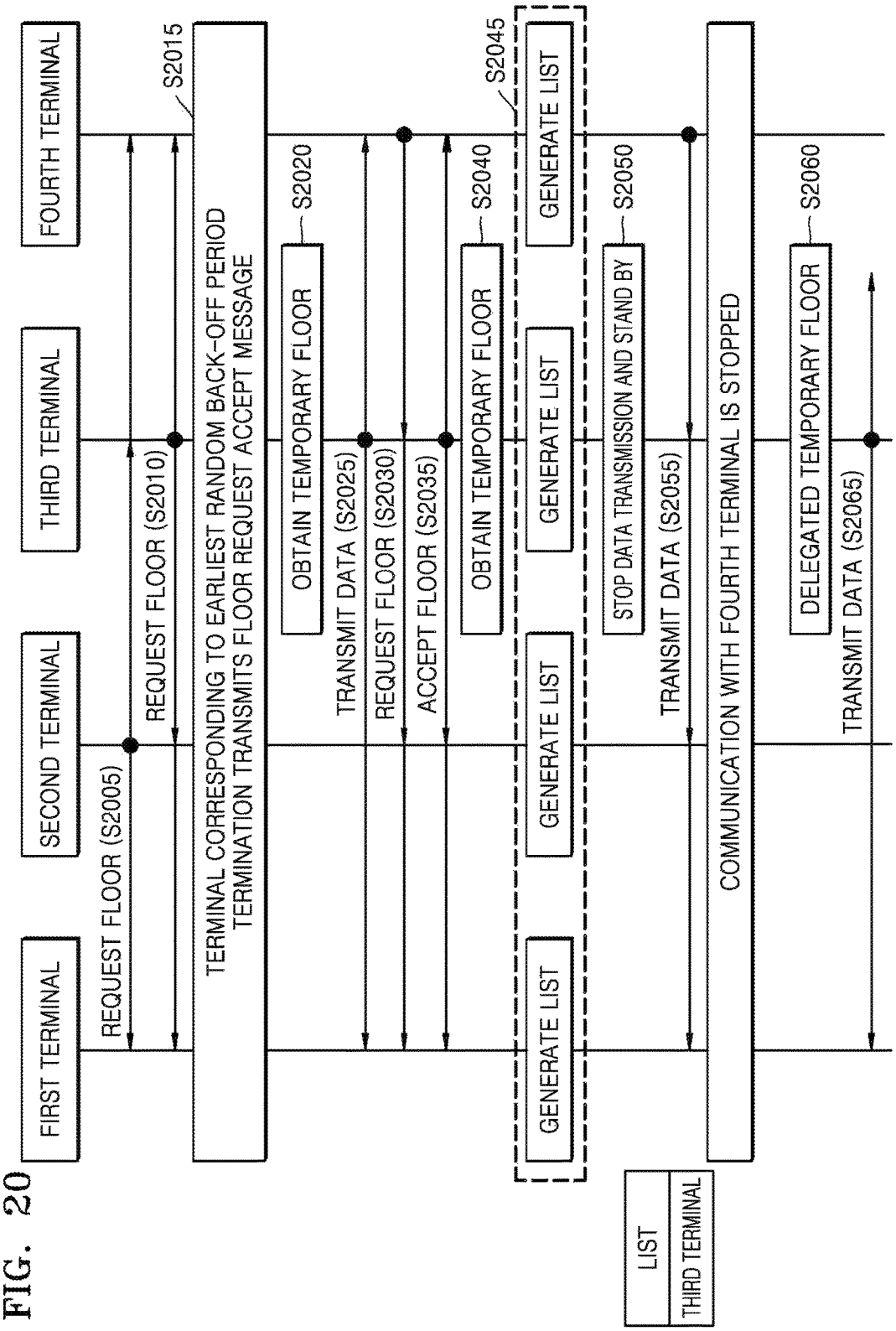
FIG. 20 is a flowchart of a method by which terminals in a group obtain temporary floors according to another exemplary embodiment.

FIG. 20 is a flowchart for describing a method by which the terminals 110, 120, 130, and 140 in a group obtain temporary floors according to another exemplary embodiment.

In operation S2005, the second terminal 120 may transmit floor requesting messages to the other terminals 110, 130, and 140 in the group.

In operation S2010, the third terminal 130 may transmit floor requesting messages to the other terminals 110, 120, and 140 in the group.

In operation S2015, a terminal corresponding to the earliest random back-off period termination from among the terminals 110, 120, 130, and 140 in the group may transmit a floor requesting message.

According to an exemplary embodiment, each of the terminals 110, 120, 130, and 140 may determine a terminal having a floor based on floor requesting messages received from the second terminal 120 and the third terminal 130. According to an exemplary embodiment, the terminals 110, 120, 130, and 140 in the group may determine the third terminal 130 having a higher priority by using priority information included in the floor requesting messages. According to another exemplary embodiment, if the priority of the second terminal 120 is identical to the priority of the third terminal 130, the terminals 110, 120, 130, and 140 in the group may select any one of the second terminal 120 and the third terminal 130 based on random number information regarding the second terminal 120 and the third terminal 130.

Meanwhile, for example, if the random back-off period of the first terminal 110 is terminated before the random back-off periods of the other terminals 120, 130, and 140 in the group are terminated, the first terminal 110 may transmit floor request accept messages regarding the third terminal 130 to the other terminals 120, 130, and 140.

According to another exemplary embodiment, information regarding the second terminal 120 may be stored in a waitlist. However, descriptions regarding FIG. 20 will be given below in relation to a case in which information regarding the second terminal 120 is not stored in a waitlist.

In operation S2020, the third terminal 130 may obtain a temporary floor by receiving the floor request accept message.

In operation S2025, the third terminal 130 may transmit data to the other terminals 110, 120, and 140 in the group.

In operation S2030, the fourth terminal 140 may transmit floor requesting messages to the other terminals 110, 120, and 130 in the group.

In operation S2035, the third terminal 130 may transmit accept messages for accepting the floor of the fourth terminal 140 to the other terminals 110, 120, and 140. Here, the data transmission of the third terminal 130 may be stopped.

In operation S2040, the fourth terminal 140 may obtain a temporary floor by receiving the floor request accept message.

In operation S2045, each of the terminals 110, 120, 130, and 140 in the group may store information regarding the third terminal 130 that stopped data transmission. For example, each of the terminals 110, 120, 130, and 140 in the group may generate a waitlist and store information regarding the third terminal 130 in the waitlist.

In operation S2050, the third terminal 130 may stop data transmission and stand by.

In operation S2055, the fourth terminal 140 may transmit data to the other terminals 110, 120, and 130 in the group.

In operation S2060, as data transmission of the fourth terminal 140 is stopped, the third terminal 130 may obtain a temporary floor. The third terminal 130 may transmit floor requesting messages to the other terminals 110, 120, and 140 in the group. As no data is received from the fourth terminal 140 for a pre-set time period or longer, the first terminal 110, the second terminal 120, and the third terminal 130 in the group may determine that a communication with the fourth terminal 140 is stopped.

In operation S2065, the third terminal 130 may transmit data to the first terminal 110 and the second terminal 120.

Figure 21:
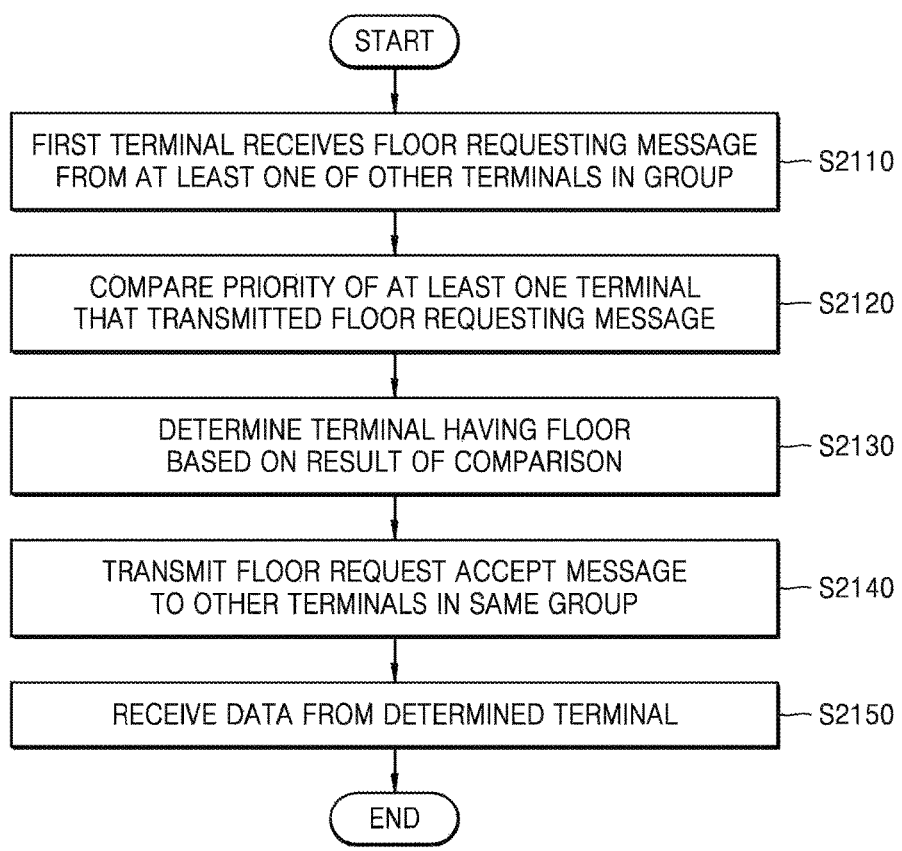
FIG. 21 is a flowchart of a method by which a first terminal, which is a floor arbitrator, determines a terminal having a floor from among a plurality of terminals in a group, according to an exemplary embodiment.

FIG. 21 is a flowchart for describing a method by which the first terminal 110, which is a floor arbitrator, determines a terminal having a floor from among the plurality of terminals 110, 120, 130, and 140 in a group, according to an exemplary embodiment.

In operation S2110, the first terminal 110 may receive a floor requesting message from at least one terminal from among the terminals 110, 120, 130, and 140 in the group.

The first terminal 110 according to an exemplary embodiment may receive a floor request from the second terminal 120. Furthermore, in another example, the first terminal 110 may receive floor requests from the second terminal 120 and the third terminal 130, respectively.

In operation S2120, the first terminal 110 may compare priorities of at least one or more terminals that transmitted floor requesting messages. A floor requesting message may include information regarding a group information, identification information, priority information, and random number information regarding a terminal that transmitted the floor requesting message.

If a plurality of floor requesting messages are received, the first terminal 110 according to an exemplary embodiment may compare priorities of terminals that transmitted the floor requesting messages. Meanwhile, if priorities of the terminals that transmitted the floor requesting messages are identical to one another, the first terminal 110 may compare random number information regarding the terminals that transmitted the floor requesting messages. Here, random number information may be newly generated by each of the terminals that transmitted the floor requesting messages every time a floor requesting message is transmitted.

Meanwhile, according to another exemplary embodiment, the first terminal 110 may determine the priorities of the second terminal 120 and the third terminal 130 based on respective time points at which floor requesting messages transmitted by the second terminal 120 and the third terminal 130 are received. For example, if a floor requesting message of the third terminal 130 is received by the first terminal 110 before a floor requesting message of the second terminal 120, the second terminal 120 may have a higher priority.

In operation S2130, the first terminal 110 may determine a terminal having a floor based on a result of the comparison.

The first terminal 110 according to an exemplary embodiment may determine the third terminal 130 having the highest priority from among the terminals that transmitted the floor requesting messages as a terminal having a floor.

In operation S2140, the first terminal 110 may transmit floor request accept messages regarding the determined terminal (e.g., the third terminal 130) to the other terminals 120, 130, and 140 in the group. For example, the first terminal 110 may multicast floor requesting messages to the other terminals 120, 130, and 140 in the group. In another example, the first terminal 110 may unicast a floor request accept message to each of the other terminals 120, 130, and 140 in the group.

In operation S2150, the first terminal 110 may receive data from the determined terminal.

The first terminal 110 may receive data transmitted by the second terminal 120 having a floor. Here, data may be multicasted or unicasted by the second terminal 120 to the other terminals 110, 130, and 140.

Figure 22:
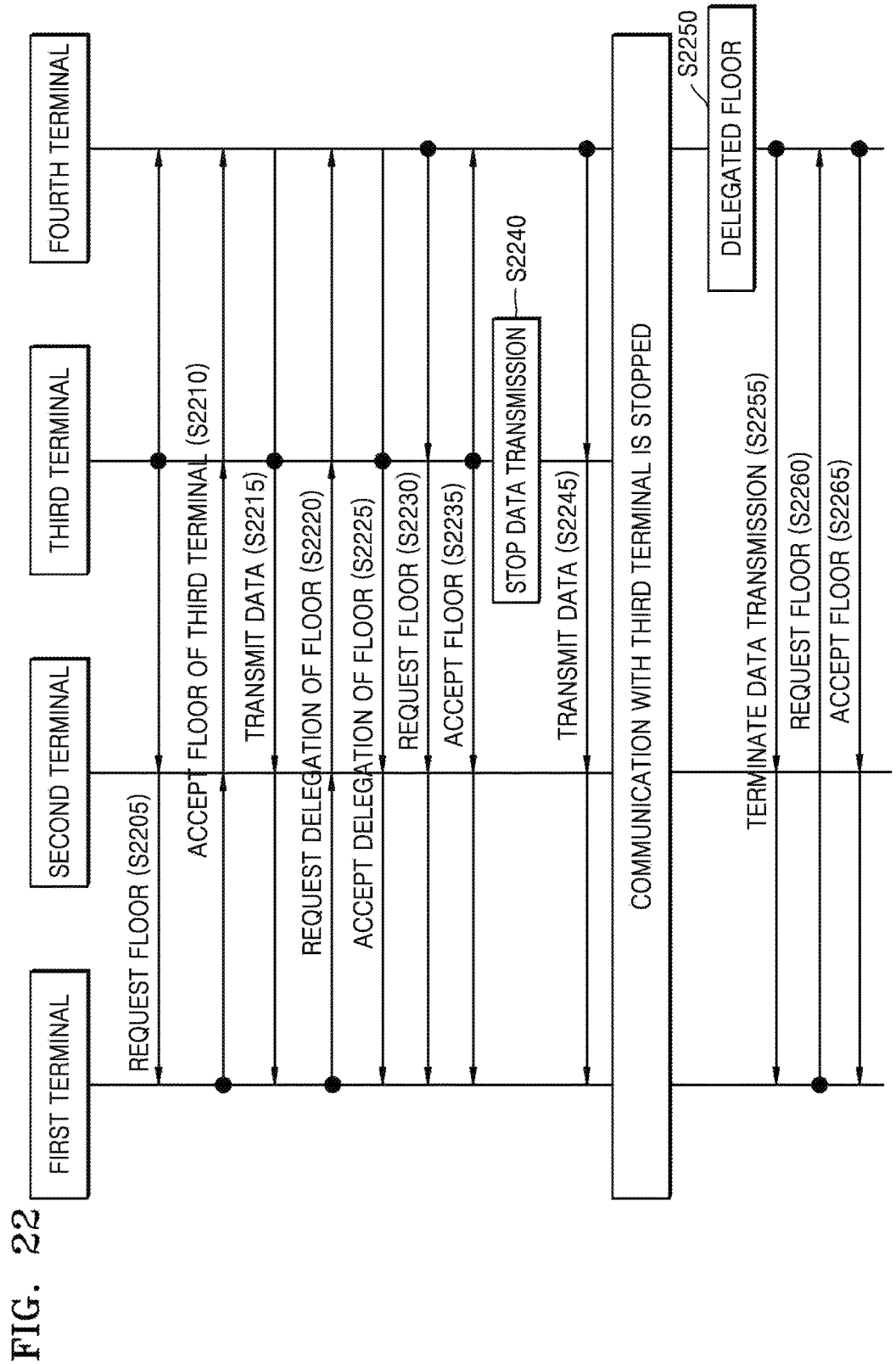
FIG. 22 is a flowchart of a method of determining a terminal having a floor in a group including a floor arbitrator, according to an exemplary embodiment.

FIG. 22 is a flowchart for describing a method of determining a terminal having a floor in a group including a floor arbitrator, according to an exemplary embodiment.

In FIG. 22, it will be assumed that the first terminal 110 is a floor arbitrator. However, this is merely an exemplary embodiment, and is not intended to be limiting.

In operation S2205, the third terminal 130 may transmit floor requesting messages to the other terminals 110, 120, and 140 in a group.

In operation S2210, the first terminal 110 may transmit a response for accepting the floor of the third terminal 130 to the other terminals 120, 130, and 140 in the group.

In operation S2215, the third terminal 130 may transmit data to the other terminals 110, 120, and 140 in the group.

In operation S2220, the first terminal 110 may transmit floor delegation requesting messages to the other terminals 120, 130, and 140 in the group.

In operation S2225, the third terminal 130 may transmit floor delegation requesting messages regarding the first terminal 110 to the other terminals 110, 120, and 140 in the group. Therefore, the third terminal 130 may be determined as a floor arbitrator.

In operation S2230, the fourth terminal 140 may transmit floor requesting messages to the other terminals 110, 120, and 130 in the group.

In operation S2235, the third terminal 130 may transmit floor request accept messages for accepting the floor of the fourth terminal 140 to the other terminals 110, 120, and 140 in the group. However, a floor requesting message is merely an example, and other messages notifying that the fourth terminal 140 obtains a floor may be transmitted to the other terminals 110, 120, and 140 in the group.

In operation S2240, the third terminal 130 may stop data transmission.

In operation S2245, the fourth terminal 140 may transmit data to the other terminals 110, 120, and 130 in the group.

In operation S2250, the fourth terminal 140 may be delegated a floor. As a communication with the third terminal 130 is stopped, the fourth terminal 140 according to an exemplary embodiment may delegate the floor to the fourth terminal 140. As no message is received from the third terminal 130 for a pre-set time period or longer, the fourth terminal 140 may determine that a communication with the third terminal 130 is stopped. Here, for example, the fourth terminal 140 may be a next floor arbitrator determined by the third terminal 130 in advance. In another example, a floor arbitrator may be determined based on pre-set priorities of the terminals 110, 120, 130, and 140.

In operation S2255, as data transmission is terminated, the fourth terminal 140 may transmit floor release messages to the other terminals 110, 120, and 130 in the group.

In operation S2260, the first terminal 110 may transmit floor requesting messages to the other terminals 120, 130, and 140 in the group.

In operation S2265, the third terminal 130 may transmit floor request accept messages to the first terminal 110 and the second terminal 120 in the group.

Figure 23:
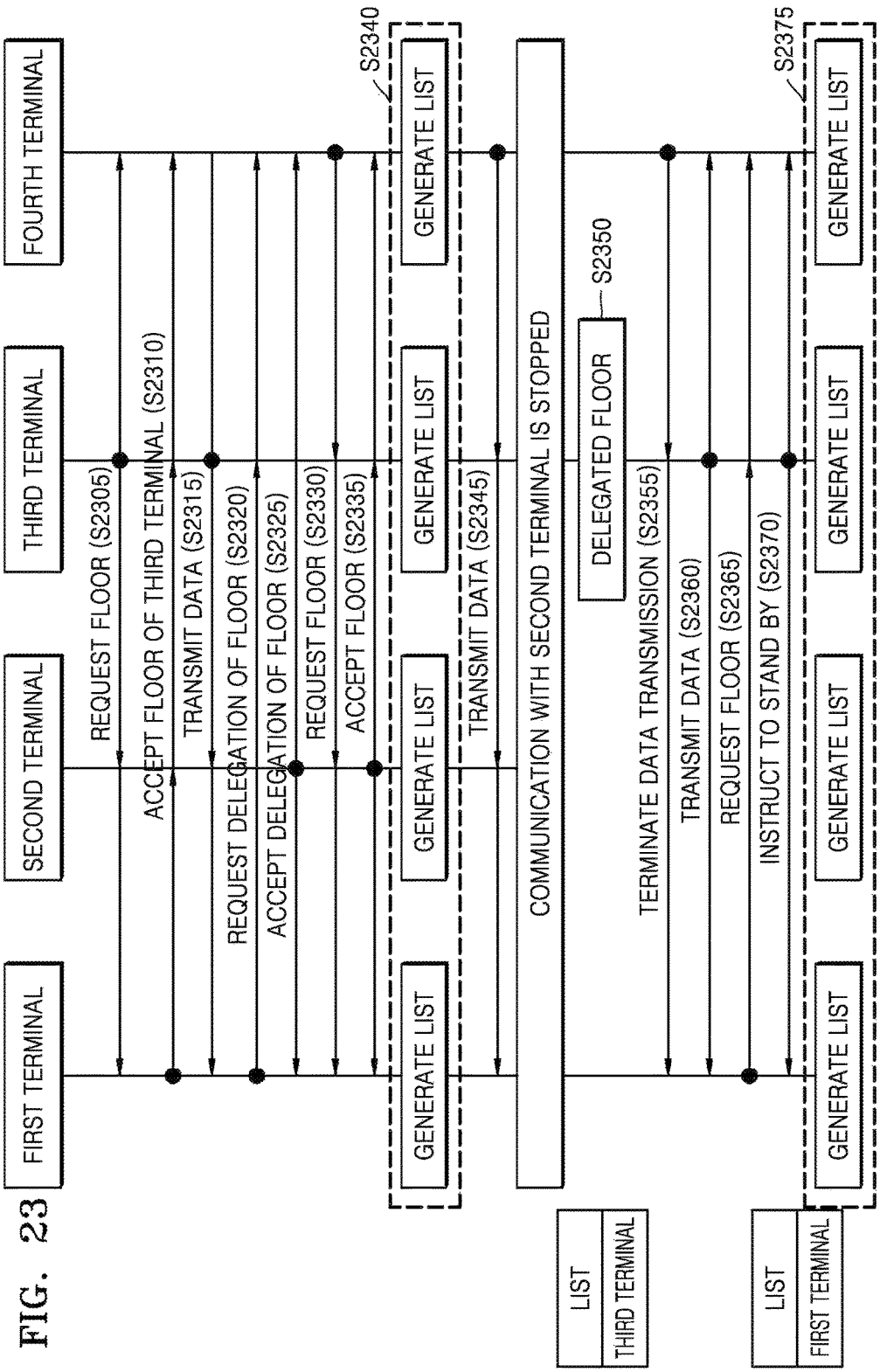
FIG. 23 is a flowchart of a method of determining a terminal having a floor in a group including a floor arbitrator, according to an exemplary embodiment.

FIG. 23 is a flowchart for describing a method of determining a terminal having a floor in a group including a floor arbitrator, according to an exemplary embodiment.

In FIG. 23, it will be assumed that the first terminal 110, which is a call controller, is a floor arbitrator.

In operation S2305, the third terminal 130 may transmit floor requesting messages to the other terminals 110, 120, and 140 in a group.

In operation S2310, the first terminal 110 may transmit a response for accepting the floor of the third terminal 130 to the other terminals 120, 130, and 140 in the group.

In operation S2315, the third terminal 130 may transmit data to the other terminals 110, 120, and 140 in the group.

In operation S2320, the first terminal 110 may transmit floor delegation requesting messages to the other terminals 120, 130, and 140 in the group.

In operation S2325, the second terminal 120 may transmit floor delegation accept messages to the other terminals 110, 130, and 140 in the group. Therefore, the second terminal 120 may be determined as a floor arbitrator.

In operation S2330, the fourth terminal 140 may transmit floor requesting messages to the other terminals 110, 120, and 130 in the group.

In operation S2335, the second terminal 120 may transmit floor request accept messages for accepting the floor of the fourth terminal 140 to the other terminals 110, 130, and 140 in the group. However, a floor requesting message is merely an example, and other messages notifying that the fourth terminal 140 obtains a floor may be transmitted to the other terminals 110, 120, and 140 in the group.

In operation S2340, each of the terminals 110, 120, 130, and 140 in the group may store information regarding the third terminal 130 that stands by to transmit data. For example, each of the terminals 110, 120, 130, and 140 in the group may generate a waitlist and store information regarding the third terminal 130 in the waitlist.

In operation S2345, the fourth terminal 140 may transmit data to the other terminals 110, 120, and 130 in the group. Furthermore, as the fourth terminal 140 obtains a floor, the third terminal 130 may stop data transmission.

In operation S2350, the third terminal 130 may be delegated a floor. As a communication with the second terminal 120 is stopped, the third terminal 130 according to an exemplary embodiment may be delegated the floor of the second terminal 120. As no data is received from the second terminal 120 for a pre-set time period or longer, the third terminal 130 may determine that a communication with the second terminal 120 is stopped. Here, for example, the third terminal 130 may be a next floor arbitrator determined by the second terminal 120 in advance.

In operation S2355, as the data transmission is terminated, the fourth terminal 140 may transmit floor release messages to the other terminals 110, 120, and 130 in the group.

In operation S2360, as the data transmission of the fourth terminal 140 is terminated, the third terminal 130 may resume data transmission.

In operation S2365, the first terminal 110 may transmit floor requesting messages to the other terminals 120, 130, and 140 in the group.

In operation S2370, since the priority of the first terminal 110 is lower than the priority of the third terminal 130, the third terminal 130 may transmit a message notifying that floor is not granted to the first terminal 110.

In operation S2375, each of the terminals 110, 120, 130, and 140 in the group may store information regarding the first terminal 110 that stands by to transmit data. For example, each of the terminals 110, 120, 130, and 140 in the group may generate a waitlist and store information regarding the first terminal 110 in the waitlist.

Figure 24:
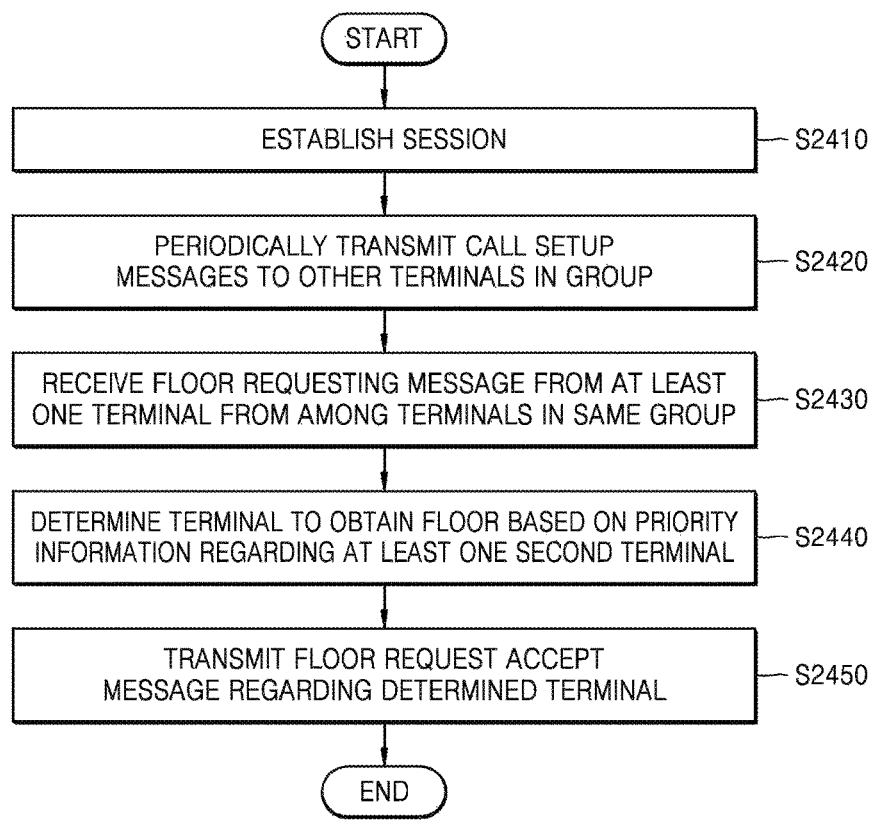
FIG. 24 is a flowchart of a method of transmitting and receiving data in a case where the communication system includes a call controller, according to another exemplary embodiment.

FIG. 24 is a flowchart for describing a method of transmitting and receiving data in case where the communication system 100 includes a call controller, according to another exemplary embodiment.

In FIG. 24, it is assumed that the first terminal 110 functions as both a call controller and a floor arbitrator of the communication system 100.

In operation S2410, the first terminal 110 may establish a session with the other terminals 120, 130, and 140 in a group. Here, a method of establishing a session may correspond to those described above with reference to FIGS. 4 through 9.

In operation S2420, the first terminal 110 may periodically transmit call setup messages for announcing the session established with the other terminals 120, 130, and 140 in the group.

In operation S2430, the first terminal 110 may receive a floor requesting message from at least one terminal from among the terminals in the group.

In operation S2440, the first terminal 110 may determine a terminal to obtain a floor based on priority information regarding at least one terminal. Here, a method by which the first terminal 110 determines a terminal to obtain a floor may correspond to those described above with reference to FIGS. 21 through 23.

In operation S2450, the first terminal 110 may transmit floor request accept messages regarding the determined terminal to the terminals in the group.

Figure 25:
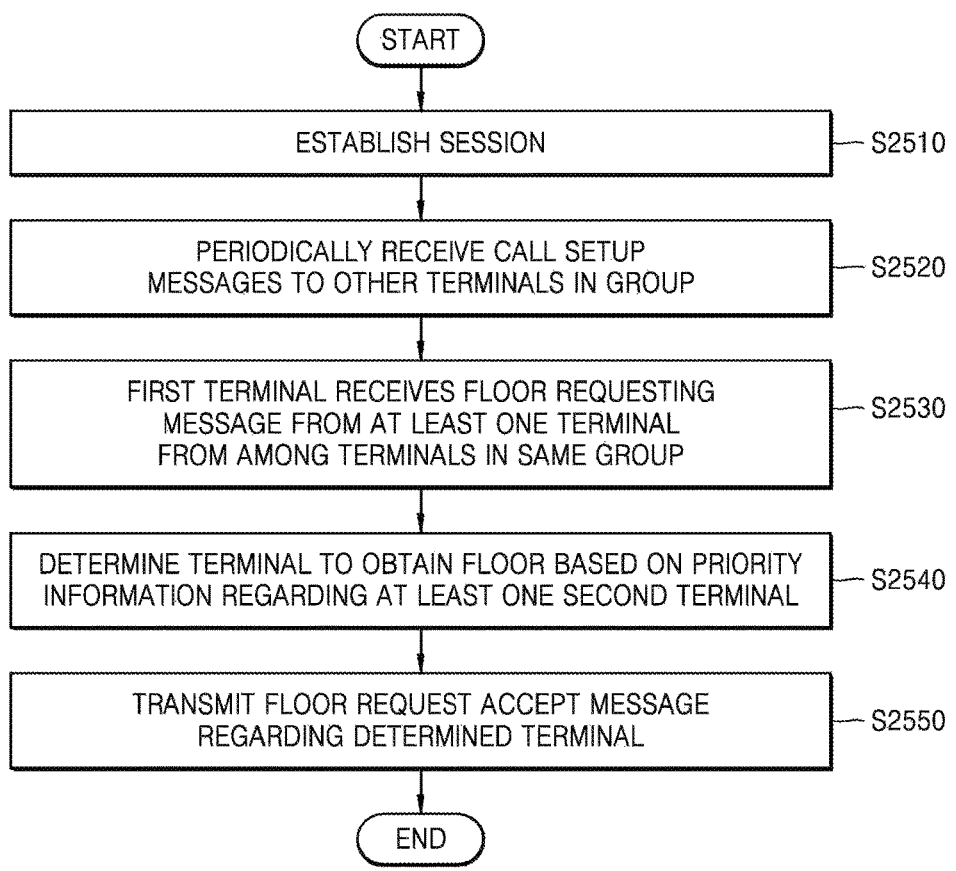
FIG. 25 is a flowchart of a method of transmitting and receiving data in a case where the communication system includes a call controller, according to another exemplary embodiment.

FIG. 25 is a flowchart for describing a method of transmitting and receiving data in case where the communication system 100 includes a call controller, according to another exemplary embodiment.

In FIG. 25, it is assumed that, in the communication system 100, the second terminal 120 is a call controller and the first terminal 110 is a floor arbitrator.

In operation S2510, the first terminal 110 may establish a session with the other terminals 120, 130, and 140 in a group. Here, a method of establishing a session may correspond to those described above with reference to FIGS. 4 through 9.

In operation S2520, the first terminal 110 may periodically receive call setup messages regarding the established session from any one (e.g., the second terminal 120) of the other terminals 120, 130, and 140, which is a call controller.

In operation S2530, the first terminal 110 may receive a floor requesting message from at least one terminal from among the terminals in the group.

In operation S2540, the first terminal 110 may determine a terminal to obtain a floor based on priority information regarding at least one terminal. Here, a method by which the first terminal 110 determines a terminal to obtain a floor may correspond to those described above with reference to FIGS. 21 through 23.

In operation S2550, the first terminal 110 may transmit floor request accept messages regarding the determined terminal to the terminals in the group.

Figure 26:
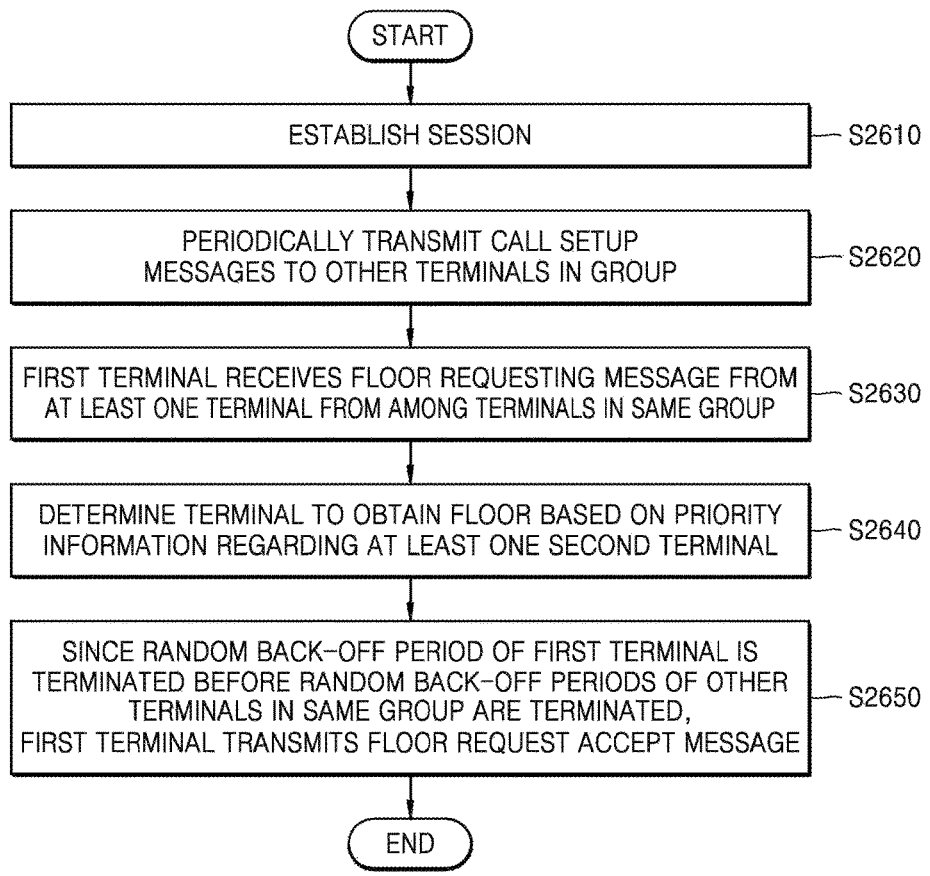
FIG. 26 is a flowchart of a method of transmitting and receiving data in a case where the communication system includes a call controller, according to another exemplary embodiment.

FIG. 26 is a flowchart for describing a method of transmitting and receiving data in a case where the communication system 100 includes a call controller, according to another exemplary embodiment.

In FIG. 26, it is assumed that, in the communication system 100, the second terminal 120 is a call controller and the first terminal 110 is a floor arbitrator.

In operation S2610, the first terminal 110 may establish a session with the other terminals 120, 130, and 140 in a group. Here, a method of establishing a session may correspond to those described above with reference to FIGS. 4 through 9.

In operation S2620, the first terminal 110 may periodically transmit call setup messages for announcing the session established with the other terminals 120, 130, and 140 in the group.

In operation S2630, the first terminal 110 may receive a floor requesting message from at least one terminal from among the terminals in the group.

In operation S2640, the first terminal 110 may determine a terminal to obtain a floor based on priority information regarding at least one terminal. Here, a method by which the first terminal 110 determines a terminal to obtain a floor may correspond to those described above with reference to FIGS. 12 through 20.

In operation S2650, because the random back-off period of the first terminal 110 is terminated first from among the terminals 110, 120, 130, and 140 in the group, the first terminal 110 may receive a floor request accept message including information regarding the determined terminal.

Figure 27:
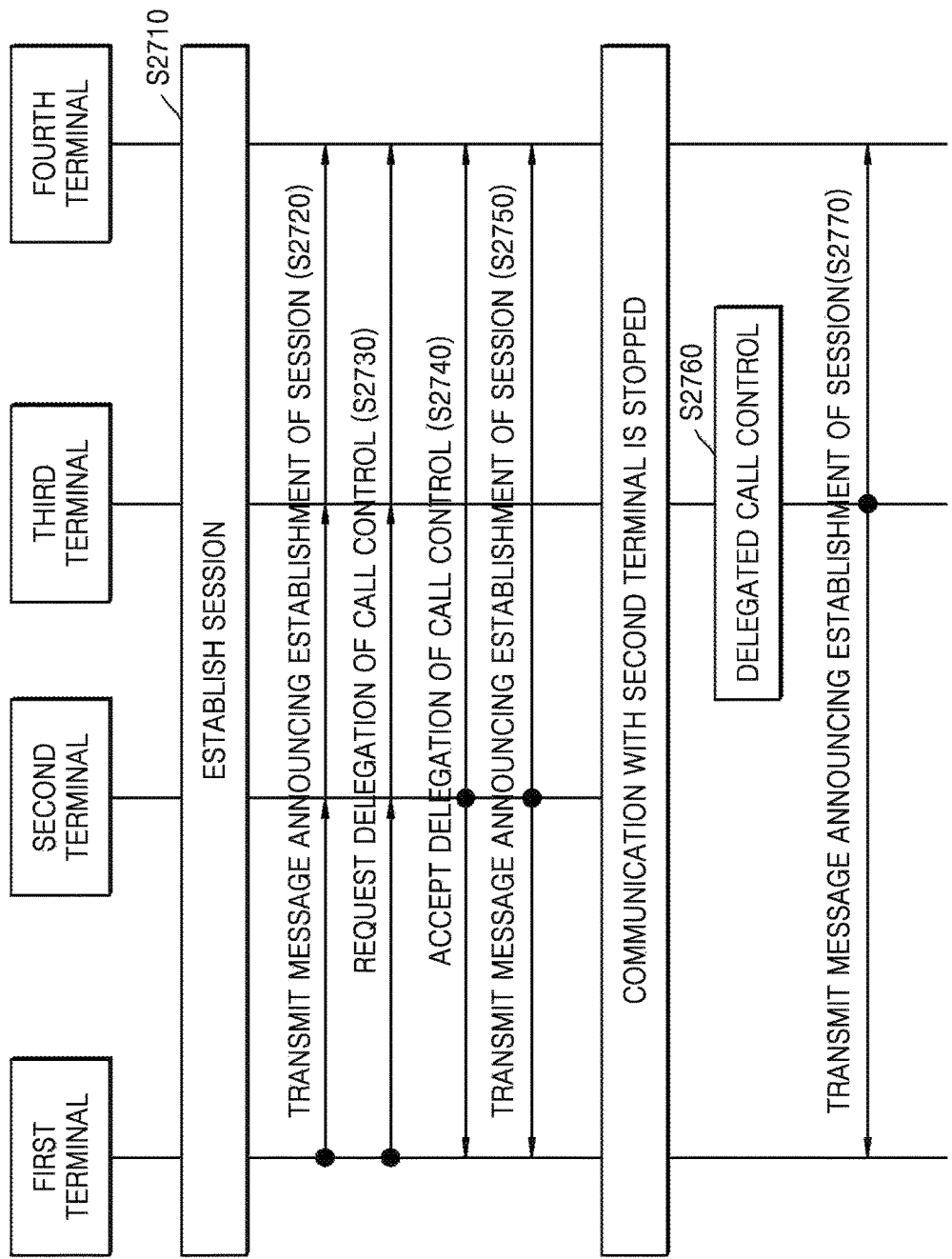
FIG. 27 is a flowchart of a method of switching a call controller from among a plurality of terminals in a group, according to an exemplary embodiment.

FIG. 27 is a flowchart for describing a method of switching a call controller from among the plurality of terminals 110, 120, 130, and 140 in a group, according to an exemplary embodiment.

In operation S2710, a session may be established between the terminals 110, 120, 130, and 140 in the group. Here, a session may be established between the terminals 110, 120, 130, and 140 in the group according to at least one of the methods described above with reference to FIGS. 4 through 9. Furthermore, according to an exemplary embodiment, it is assumed that the first terminal 110 is a call controller.

In operation S2720, the first terminal 110 may transmit messages announcing establishment of the session to the other terminals 120, 130, and 140 in the group.

In operation S2730, the first terminal 110 may transmit call control delegation requesting messages for delegating a call control to the other terminals 120, 130, and 140 in the group. Here, the call control delegation requesting message may include information regarding a terminal to be delegated a call control in advance. Furthermore, in another example, information regarding a delegation sequence may be stored in the terminals 110, 120, 130, and 140 in advance. In another example, any one of the terminals 110, 120, 130, and 140 may be arbitrarily selected as a terminal to be delegated a call control.

In operation S2740, the second terminal 120 may transmit call control delegation accept messages to the other terminals 110, 130, and 140 in the group. The second terminal 120 according to an exemplary embodiment may be delegated a call control.

In operation S2750, the second terminal 120 may transmit messages announcing establishment of the session to the other terminals 110, 130, and 140 in the group. According to an exemplary embodiment, as the second terminal 120 is delegated a call control, the second terminal 120 may periodically transmit messages announcing establishment of the session to the other terminals 110, 130, and 140 in the group.

In operation S2760, as a communication with the second terminal 120 is stopped, the third terminal 130 may be delegated a call control.

Since no message announcing establishment of a session is received from the second terminal 120, the third terminal 130 according to an exemplary embodiment may determine that a communication with the second terminal 120 is stopped. The third terminal 130 may be determined in advance as a next call controller after the second terminal 120. Therefore, if it is determined that a communication with the second terminal 120 is stopped, the third terminal 130 may be delegated a call control. According to another exemplary embodiment, the third terminal 130 may re-transmit a call setup message in the group and re-establish a session.

In operation S2770, the third terminal 130 may transmit messages announcing an established session to the other terminals 110, 120, and 140 in the group. According to an exemplary embodiment, as the third terminal 130 is delegated a call control, the third terminal 130 may periodically transmit messages announcing an established session to the other terminals 110, 120, and 140 in the group.

Figure 28:
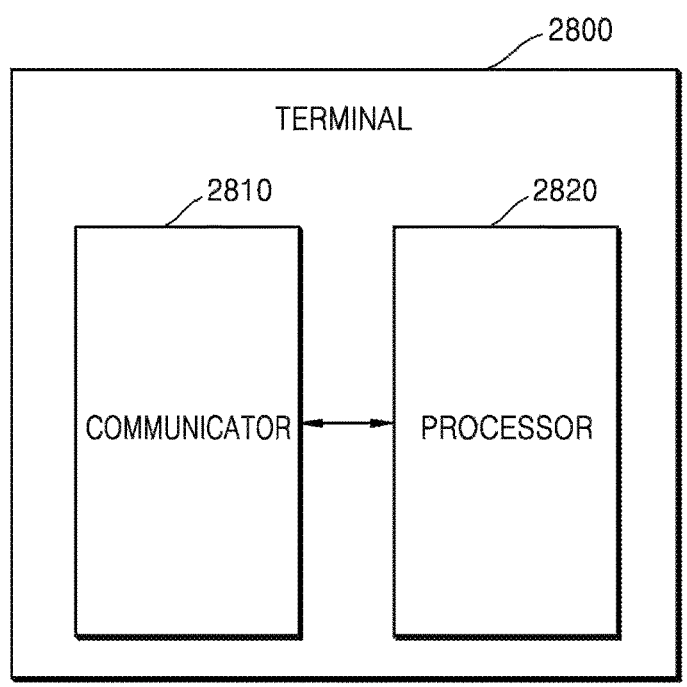
FIGS. 28 and 29 are block diagrams showing terminals according to an exemplary embodiment.
Figure 29:
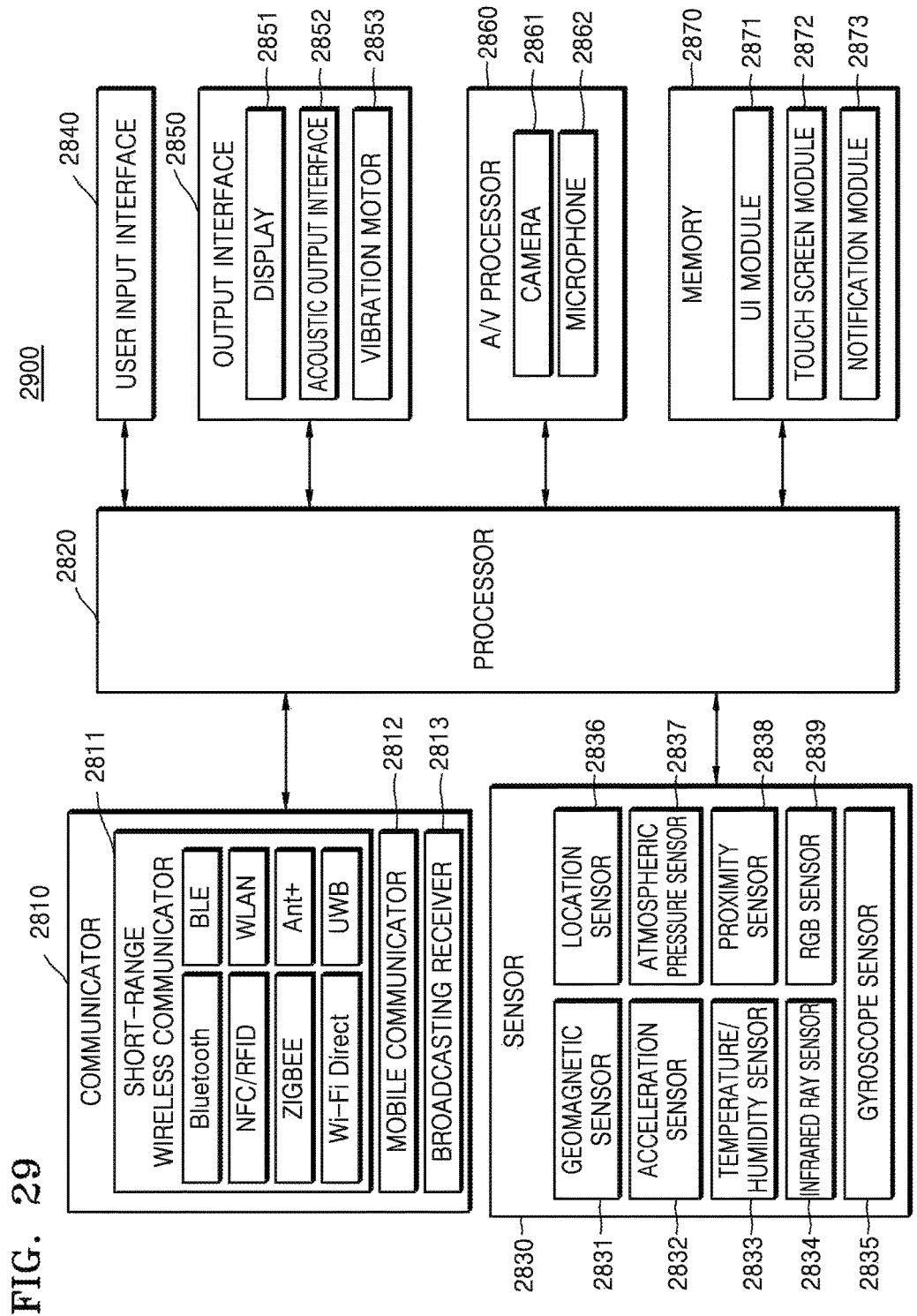

FIGS. 28 and 29 are block diagrams showing terminals 2800 according to an exemplary embodiment.

As shown in FIG. 28, the terminal 2800 according to an exemplary embodiment may include a communicator 2810 and a processor 2820. However, not all of the components shown in FIGS. 28 and 29 are necessary. The terminal 2800 may include less components or more components than the components shown in FIGS. 28 and 29.

For example, as shown in FIG. 29, a terminal 2800 may not only include a communicator 2810 and the processor 2820, but also include a sensor 2830, an user input interface 2940, an output interface 2950, an A/V processor 2960, and a memory 2970.

Meanwhile, the terminal 2800 of FIGS. 28 and 29 may correspond to any one of the plurality of terminals 110, 120, 130, and 140 described above with reference to FIGS. 1 through 27.

Detailed descriptions of the components will be given below.

The communicator 2810 transmits call setup messages to a plurality of the other terminals 120, 130, and 140.

The communicator 2810 according to an exemplary embodiment may transmit and receive messages for establishing a session or data to and from the other terminals in a group.

The communicator 2810 according to an exemplary embodiment may multicast call setup messages to the other terminals in the group. According to another exemplary embodiment, the communicator 2810 may unicast a call setup message to each of the other terminals in the group.

The communicator 2810 according to an exemplary embodiment receives a call setup message from at least one terminal from among the other terminals in a group including the terminal 2800 belongs.

In another example, if there is an already established session, the communicator 2810 may transmit a call setup decline message notifying that there is a session already established with the terminal 2800. The communicator 2810 may transmit a call setup decline message after a time period corresponding to an arbitrary value selected by the processor 2820 within a pre-set range.

Meanwhile, if a call setup decline message received from at least one of the other terminals in the group is identical to a call setup decline message to be transmitted by the communicator 2810, the communicator 2810 may not transmit a call setup decline message to the other terminals.

Furthermore, no other call setup request message is received for a pre-set time period, the communicator 2810 may transmit a call setup request message. If there is a session already established between a first terminal and the other terminals in a group, the communicator 2810 may receive a message announcing that there is an already established session from at least one other terminal that received the transmitted call setup request message.

The communicator 2810 according to an exemplary embodiment may receive a call setup request message from another terminal during a pre-set buffering period that is initiated after a call setup request message is transmitted. Furthermore, if information included in a received call setup accept message is different from information regarding a selected terminal, the communicator 2810 may transmit a call setup accept message of the terminal 2800 to the other terminals in a group after a random back-off period.

The communicator 2810 according to an exemplary embodiment may transmit floor requesting messages for requesting a floor to the other terminals in a group. Furthermore, the communicator 2810 may receive a floor request accept message from a terminal corresponding to the earliest random back-off period termination from among the other terminals in the group and transmit data to the other terminals in the group.

If the communicator 2810 according to an exemplary embodiment receives a floor requesting message from another terminal in the group while the communicator 2810 is transmitting data and the priority of the terminal 2800 is higher than the priority of the other terminal, the processor 2820 may store information regarding the other terminal.

The communicator 2810 according to an exemplary embodiment may receive a floor requesting message from any one of the other terminals in the group. If the priority of the other terminal is higher than the priority of the terminal 2900, the processor 2920 may stop data transmission.

The communicator 2810 according to an exemplary embodiment may receive data from another terminal. Furthermore, as the communicator 2810 receives a floor release message announcing termination of data transmission from another terminal, the terminal 2800 may obtain a floor.

The communicator 2810 according to an exemplary embodiment may transmit floor requesting messages for requesting a floor to the other terminals in a group.

The communicator 2810 may receive a floor requesting message from another terminal and, if the priority of the other terminal is higher than the priority of the terminal 2800, may receive a floor revoke message.

The communicator 2810 may include one or more components that enables a communication between the terminal 2800 and a second display of an external terminal. For example, the communicator 2810 may include a short-range communicator 2811, a mobile communicator 2812, and a broadcasting receiver 2813.

The short-range wireless communicator 2811 may include a Bluetooth communicator, a Bluetooth low energy (BLE) communicator, a near field communication (NFC) unit, a Wi-Fi (WLAN) communicator, a Zigbee communicator, an infrared data association (IrDA) communicator, a Wi-Fi direct (WFD) communicator, an ultra-wideband (UWB) communicator, and an Ant+ communicator. However, exemplary embodiments are not limited thereto.

The mobile communicator 2812 may transmit and receive wireless signals to and from at least one of a base station, an external terminal, and a server on a mobile communication network. Here, wireless signals may include voice call signals, video call signals, or various types of data associated with transmission and reception of text/multimedia messages.

The broadcasting receiver 2813 may receive broadcasting signals and/or broadcasting-related information from outside via broadcasting channels. The broadcasting channels may include satellite channels and ground wave channels. According to some exemplary embodiments, the terminal 2800 may not include the broadcasting receiver 2813.

The processor 2820 may control the overall operations of the terminal 2800. For example, the processor 2820 may execute programs stored in the memory 2870, thereby controlling the overall operations of the communicator 2810, the user input interface 2840, the sensor 2830, the A/V processor 2860, the A/V processor 2860, and the memory 2870.

The processor 2820 according to an exemplary embodiment may establish a session with at least one of terminals 120, 130, and 140 that received the call setup messages transmitted by the communicator 2810.

The processor 2820 according to an exemplary embodiment may establish a session with at least one of the terminals 120, 130, and 140 that received the transmitted call setup messages, based on port information, password key information, and codec information included in the transmitted call setup messages. According to another exemplary embodiment, the processor 2820 may establish a session based on responses from the terminals 120, 130, and 140 that received the call setup messages transmitted by the communicator 2810.

For example, as the communicator 2810 receives call setup accept messages, the processor 2820 may establish sessions with the second terminal 120, the third terminal 130, and the fourth terminal 140, respectively.

In another example, the communicator 2810 may receive a call setup decline message indicating that there is an already established session from at least one of the second terminal 120, the third terminal 130, and the fourth terminal 140. If the communicator 2810 receives a call setup decline message, a session initiated by the processor 2820 may not be established.

Meanwhile, according to an exemplary embodiment, after a session is established, the processor 2820 may periodically transmit messages notifying the established session to the second terminal 120, the third terminal 130, and the fourth terminal 140 through the communicator 2810. However, this is merely an exemplary embodiment, and an arbitrary terminal from among the first terminal 110, the second terminal 120, the third terminal 130, and the fourth terminal 140 may periodically transmit messages notifying an established session to the other terminals in a group. Furthermore, a terminal transmitting messages notifying an established session may not be limited to any one of the terminals 110, 120, 130, and 140 in a group.

According to another exemplary embodiment, if call setup messages are received from a plurality of terminals, the processor 2820 may compare the priority of the plurality of terminals and select any one of the plurality of terminals. Here, priorities of the terminals in the communication system 100 may be set in advance.

However, this is merely an example, and the processor 2820 may select any one of the plurality of terminals based on time points at which call setup messages are respectively received from the plurality of terminals.

Meanwhile, in the communication system 100 according to an exemplary embodiment, in a case where some call setup messages are not received during a buffering period due to reasons including a communication abnormality, a selected terminal may be changed based on a call setup message received after the buffering period. For example, after a buffering period is terminated, the processor 2820 may determine whether a selected terminal is appropriate based on call setup accept messages received during random back-off periods and updating periods. Here, call setup accept messages may be respectively transmitted by the other terminals in a group after of respective random back-off periods set to the other terminals are terminated.

If it is determined based on received call setup accept messages that there is a call setup message not received by the communicator 2810, the processor 2820 may re-select a terminal. For example, if a call setup message from the third terminal 130 is not received, the processor 2820 may re-select the third terminal 130 based on call setup accept messages of the other terminals received during random back-off periods and updating periods.

The processor 2820 may establish a session with a selected terminal. After the session is established, the processor 2820 according to an exemplary embodiment may transmit floor requesting messages to the other terminals in the group, respectively through the communicator 2810.

The processor 2820 may select any one of at least one terminal based on at least one of existence of a session already established with the terminal 2800 and priority information included in a call setup message.

The sensor 2830 may include at least one of a geomagnetic sensor 2831, an acceleration sensor 2832, a temperature/humidity sensor 2833, an infrared ray sensor 2834, a gyroscope sensor 2835, a location sensor (e.g., a GPS) 2836, an atmospheric pressure sensor 2837, a proximity sensor 2838, and a RGB sensor 2839, but is not limited thereto. Since functions of the respective sensors are obvious to one of ordinary skill in the art, detailed descriptions thereof will be omitted.

The user input interface 2840 refers to a unit by which a user may input data for controlling the terminal 2800. For example, the user input interface 2840 may include a key pad, a dome switch, a touch pad (capacitive overlay type, resistive overlay type, infrared beam type, surface acoustic wave type, integral strain gauge type, piezoelectric effect type, etc.), a jog wheel, and a jog switch, but is not limited thereto.

The user input interface 2840 according to an exemplary embodiment may receive a user input for selecting an operating system displayed on at least one of a first display and a second display from among a plurality of operating systems installed on the terminal 2800. Furthermore, the user input interface 2840 may receive a user input for switching an operating system displayed on at least one of a first display and a second display from among a plurality of operating systems installed on the terminal 2800. However, these are merely exemplary embodiments, and the user input interface 2840 may receive user inputs for performing the operations of the terminal 2800 as described above with reference to FIGS. 1 through 27.

The output interface 2850 may be a unit for performing an operation determined by the processor 2820 and may include a display 2851, an acoustic output interface 2852, and a vibration motor 2853.

Meanwhile, if the display 2851 and a touch pad form a layered structure and are configured as a touch screen, the display 2851 may be used not only as an output device, but also as an input device. The display 2851 may include at least one of a liquid crystal display, a thin-film transistor-LCD, an organic light emitting diode, a flexible display, a 3D display, and an electrophoretic display. Furthermore, according to exemplary embodiments of the terminal 2800, the terminal 2800 may further include one or more displays other than the display 2851.

The acoustic output interface 2852 may output audio data received from the communicator 2810 or stored in the memory 2870. Furthermore, the acoustic output interface 2852 may output acoustic signals (e.g., a call signal reception sound, a message reception sound, a notification sound, etc.) related to functions performed by the terminal 2800. The acoustic output interface 2852 may include a speaker or a buzzer.

The vibration motor 2853 may output vibration signals. For example, the vibration motor 2853 may output vibration signals corresponding to output of audio data or video data (e.g., a call signal reception sound, a message reception sound, etc.). Furthermore, if a touch is input to a touch screen, the vibration motor 2853 may output a vibration signal.

The A/V processor 2860 may be a unit for inputting audio signals or video signals and may include a camera 2861 and a microphone 2862, for example. The camera 2861 may obtain image frames, such as still images or moving pictures, via an image sensor in a video call mode or an image capture mode. An image captured via an image sensor may be processed by the processor 2820 or a separate image processor (not shown).

Image frames processed by the camera 2861 may be stored in the memory 2870 or transmitted to outside via the communicator 2810. Two or more cameras 2861 may be arranged according to configurations of the terminal 2800.

The microphone 2862 may receive outside acoustic signals and processes the same into electric voice data. For example, the microphone 2862 may receive acoustic signals from an external terminal or a speaker. The microphone 2862 may utilize various noise removing algorithms for removing noises that are formed during reception of outside acoustic signals.

The memory 2870 may store programs for processing and controlling the processor 2820 or data that are input/output.

The memory 2870 according to an exemplary embodiment may store information regarding priorities and random numbers regarding terminals in a group. Furthermore, the memory 2870 may store waitlists of terminals that transmitted floor requesting messages. The memory 2870 may store parameter information for establishing a session, such as port information and password key information for data transmission and reception between terminals in the group.

The memory 2870 may include at least one of a flash memory type storage medium, a hard disk type storage medium, a multimedia card micro type storage medium, a card type memory (e.g., a SD memory or an XD memory), a random access memory (RAM), a static RAM, a read-only memory (ROM), an electrically erasable/programmable read-only memory (EEPROM), a programmable ROM, a magnetic memory, a magnetic disk, and an optical disc. Furthermore, the terminal 2800 may include a web storage or a cloud server that functions as the memory 2870 on the internet.

Programs stored in the memory 2870 may be categorized into a plurality of modules according to functions thereof, e.g., a user interface (UI) module 2871, a touch screen module 2872, and a notification module 2873.

The UI module 2871 may provide a dedicated UI or graphical user interface (GUI) in conjunction with the terminal 2800 for each application. The touch screen module 2872 may detect a touch gesture of a user on a touch screen and transmit information regarding the touch gesture to the processor 2820. The touch screen module 2872 according to an exemplary embodiment may recognize and analyze touch codes. The touch screen module 2872 may be embodied as a separate hardware including a controller.

Various sensors may be arranged inside or nearby a touch screen to detect a touch or a proximity touch on the touch screen. An example of sensors for detecting a touch on a touch screen is a tactile sensor. The tactile sensor refers to a sensor that detects contact of a particular object at a sensitivity equivalent to that of a human's detection capability or at a higher sensitivity. The tactile sensor may detect various information, such as roughness of a contact surface, hardness of a contacting object, a temperature at a contact point, etc.

Furthermore, another example of sensors for detecting a touch on a touch screen is a proximity sensor.

The proximity sensor may refer to a sensor that detects existence of an object approaching to a certain detection surface or a nearby object by using an electromagnetic field or an infrared ray without a mechanical contact. Examples of proximity sensors may include a transmissive photoelectric sensor, a direct-reflective photoelectric sensor, a mirror-reflective photoelectric sensor, a high-frequency oscillating proximity sensor, an electrostatic capacitive proximity sensor, a magnetic proximity sensor, an infrared ray proximity sensor, etc. Touch gestures of a user may include a tap, a touch-and-hold, a double-tap, a drag, a pan, a flick, a drag-and-drop, a swipe, etc.

The notification module 2873 may generate a signal for notifying occurrence of an event at the terminal 2800. Examples of events occurring at the terminal 2800 may include acquisition or reception of new information to an application, a signal reception, a message reception, a key signal input, a schedule notification, an acquisition of a user input, etc. The notification module 2873 may output a notification signal in the form of a video signal via the display 2851, in the form of an audio signal via the acoustic output interface 2852, or in the form of a vibration signal via the vibration motor 2853.

The device described herein may include a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the present disclosure, reference has been made to the exemplary embodiments illustrated in the drawings, and specific language has been used to describe these exemplary embodiments. However, no limitation of the scope of the inventive concept is intended by this specific language, and the inventive concept should be construed to encompass all exemplary embodiments that would normally occur to one of ordinary skill in the art.

Exemplary embodiments may be described in terms of functional block components and various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, exemplary embodiments could employ any number of conventional techniques for electronics configuration, signal processing and/or control, data processing and the like. The words "mechanism", "element", "means", and "configuration" are used broadly and are not limited to mechanical or physical exemplary embodiments, but can include software routines in conjunction with processors, etc.

The particular implementations shown and described herein are illustrative exemplary embodiments and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless the element is specifically described as "essential" or "critical".

What is claimed is:

1. A method of communication among a plurality of terminals, by a first terminal, the method comprising:
    establishing a session with an other terminal of a MCPTT (Mission Critical Push To Talk) group;
    transmitting, to the MCPTT group, first media from the first terminal acting as a floor arbitrator;
    receiving a floor request message from a second terminal of the MCPTT group during the transmitting of the first media, wherein the floor request message is transmitted from the second terminal to the MCPTT group;
    determining whether a floor of the first terminal is revoked based on priority information of the first terminal and the second terminal;
    stopping a transmission of the first media in response to the floor of the first terminal being revoked; and
    transmitting, to the MCPTT group, a floor granted message for the second terminal,
    wherein in response to transmitting of the floor granted message, second media of the second terminal acting as a new floor arbitrator is transmitted to the MCPTT group.

2. The method of claim 1, further comprising monitoring whether a call setup request message of at least one other terminal is received within a pre-set time period,
    wherein, if the call setup request message of the at least one other terminal is not received during the pre-set time period, a call setup request message of the first terminal is transmitted.

3. The method of claim 1, further comprising, if a pre-existing session is already established between the first terminal and at least one other terminal, receiving a message announcing the pre-existing session from the at least one other terminal.

4. The method of claim 2, wherein, the call setup request message of the first terminal includes at least one from among identification information regarding the plurality of terminals, identification information regarding the first terminal, information regarding a priority of the first terminal, and information regarding a random number generated by the first terminal.

5. The method of claim 1, wherein the establishing of the session comprises:
    receiving a call setup request message of at least one other terminal during a pre-set buffering period initiated after a call setup request of the first terminal is transmitted; and
    selecting a selected terminal from among the first terminal and the at least one other terminal based on the priority information of the first terminal and priority information of the at least one other terminal.

6. The method of claim 5, wherein the establishing of the session comprises:
    comparing information included in at least one call setup accept message received during a random back-off period initiated after the pre-set buffering period, to information regarding the selected terminal; and,
    if the information included in the at least one call setup accept message is different from the information regarding the selected terminal, transmitting a call setup accept message of the first terminal to the at least one other terminal after the random back-off period.

7. The method of claim 1, further comprising:
    transmitting a floor requesting message of the first terminal for requesting the floor to at least one other terminal;
    receiving a floor request accept message from the-at least one other terminal, in response to a random back-off period of the at least one other terminal being terminated; and
    initiating a data transmission of the first terminal to the MCPTT group.

8. The method of claim 7, wherein the other terminal comprises a third terminal of the plurality of terminals,
    wherein the method further comprises receiving a floor requesting message of the third terminal, and
    wherein, if a priority of the first terminal is higher than a priority of the thirds terminal, a media transmission of the third terminal is initiated after the transmission of the first terminal being terminated.

9. A first terminal comprising:
    a communicator; and
    a controller, configured to:
        establish a session with an other terminal of a MCPTT group,
        transmit, to the MCPTT group, first media from the first terminal acting as a floor arbitrator,
        receive a floor request message from a second terminal of the MCPTT group during the transmitting of the first media, wherein the floor request message is transmitted from the second terminal to the MM, CPTI group, determine whether a floor of the first terminal is revoked based on priority information of the first terminal and the second terminal, stop a transmission of the first media in response to the floor of the first terminal being revoked, and transmit, to the MCPTT group, a floor granted message for the second terminal, wherein in response to transmitting of the floor granted message, second media of the second terminal acting as a new floor arbitrator is transmitted to the MCPTT group.

10. The first terminal of claim 9, wherein the controller is further configured to monitor whether a call setup request message of at least one other terminal is received within a pre-set time period, and, if the call setup request message of the at least one other terminal is not received during the pre-set time period, the communicator is further configured to transmit a call setup request message of the first terminal.

11. The first terminal of claim 9, wherein, if a pre-existing session is already established between the first terminal and at least one other terminal, the communicator is further configured to receive a message announcing the pre-existing session from the at least one other terminal.

12. The first terminal of claim 10, wherein the call setup request message of the first terminal includes at least one from among identification information regarding the MCPTT group, identification information regarding the first terminal, information regarding a priority of the first terminal, and information regarding a random number generated by the first terminal.

13. The first terminal of claim 9, wherein the communicator is further configured to receive a call setup request message of at least one other terminal during a pre-set buffering period initiated after a call setup request message of the first terminal is transmitted, and the controller is further configured to select a selected terminal from among the first terminal and the at least one other terminal based on the priority information of the first terminal and priority information of the at least one other terminal.

14. The first terminal of claim 13, wherein the controller is further configured to compare information included in at least one call setup accept message received during a random back-off period initiated after the pre-set buffering period, to information regarding the selected terminal, and, if the information included in the at least one call setup accept message is different from the information regarding the selected terminal, the communicator is further configured to transmit a call setup accept message of the first terminal to the at least one other terminal after the random back-off period.

15. The first terminal of claim 9, wherein the communicator is further configured to transmit a floor requesting message of the first terminal for requesting the floor to the other terminal, receive a floor request accept message from at least one other terminal, in response to a random back-off period of the at least one other terminal being terminated, and initiate a data transmission of the first terminal to the MCPTT group.

16. The first terminal of claim 15, wherein the other terminal comprises a third terminal of the MCPTT group, wherein the communicator is further configured to receive a floor requesting message of the third terminal, and wherein if a priority of the first terminal is higher than a priority of the third terminal, a media transmission of the third terminal is initiated after the transmission of the first terminal being terminated.

17. A non-transitory computer readable recording medium having recorded thereon a computer program for implementing the method of claim 1.

* * * * *